(12) United States Patent
Kang et al.

(10) Patent No.: US 12,276,370 B2
(45) Date of Patent: Apr. 15, 2025

(54) MOUNTING DEVICE FOR DISPLAY DEVICE

(71) Applicant: SAMSUNG ELECTRONICS CO., LTD., Suwon-si (KR)

(72) Inventors: Namhyun Kang, Suwon-si (KR); Minah Koh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/091,181

(22) Filed: Dec. 29, 2022

(65) Prior Publication Data

US 2023/0184370 A1 Jun. 15, 2023

Related U.S. Application Data

(63) Continuation of application No. PCT/KR2022/019042, filed on Nov. 29, 2022.

(30) Foreign Application Priority Data

Dec. 13, 2021 (KR) .................. 10-2021-0177706
Apr. 12, 2022 (KR) .................. 10-2022-0045222

(51) Int. Cl.
  *F16M 11/22* (2006.01)
  *F16M 11/04* (2006.01)
  *F16M 11/12* (2006.01)

(52) U.S. Cl.
  CPC .......... *F16M 11/22* (2013.01); *F16M 11/041* (2013.01); *F16M 11/046* (2013.01);
  (Continued)

(58) Field of Classification Search
  CPC ...... F16M 11/22; F16M 11/046; A47B 19/00; A47B 19/08; A47B 19/06
  (Continued)

(56) References Cited

U.S. PATENT DOCUMENTS 10,254,794 B1   4/2019   Wu et al.
11,137,107 B2   10/2021  Roudaut
(Continued)

FOREIGN PATENT DOCUMENTS

CN   113055517   6/2021
JP   2014-178550 9/2014
(Continued)

OTHER PUBLICATIONS

Search Report dated Mar. 6, 2023 issued in International Patent Application No. PCT/KR2022/019042.
(Continued)

*Primary Examiner* — Alfred J Wujciak
(74) *Attorney, Agent, or Firm* — Nixon & Vanderhye P.C.

(57) ABSTRACT

A mounting device for a display device includes a driving plate, which includes: a first surface and a second surface opposite to the first surface and configured to move integrally with the display device when the display device is attached to the first surface, a body plate disposed in parallel with the driving plate to contact at least a portion of the second surface of the driving plate and which includes a slide lock configured to restrict a linear movement of the driving plate, and a stand plate disposed on a surface opposite to a surface of the body plate coupled to the driving plate. The slide lock may remain locked in a ground mode in which the body plate and the stand plate overlap each other, and may be unlocked in a stand mode in which the body plate and the stand plate are spaced apart from each other.

15 Claims, 21 Drawing Sheets

(52) U.S. Cl.
CPC ..... *F16M 11/125* (2013.01); *F16M 2200/024* (2013.01); *F16M 2200/028* (2013.01)

(58) Field of Classification Search
USPC ................ 248/444, 447, 449, 454, 458, 457
See application file for complete search history.

(56) References Cited

U.S. PATENT DOCUMENTS

| | | | | |
|---|---|---|---|---|
| 2005/0109893 | A1* | 5/2005 | Chueh | F16M 11/10 248/133 |
| 2020/0053891 | A1* | 2/2020 | Kim | F16M 11/22 |
| 2020/0208772 | A1* | 7/2020 | Woo | G06F 1/1601 |

FOREIGN PATENT DOCUMENTS

| | | |
|---|---|---|
| KR | 10-2006-0068004 | 6/2006 |
| KR | 10-0606771 | 7/2006 |
| KR | 20-0452085 | 1/2011 |
| KR | 10-1086704 | 11/2011 |
| KR | 10-1267355 | 5/2013 |
| KR | 10-2020-0104147 | 9/2020 |
| KR | 10-2209787 | 1/2021 |
| KR | 10-2210235 | 2/2021 |
| KR | 10-2021-0088353 | 7/2021 |

OTHER PUBLICATIONS

Extended European Search Report dated Dec. 13, 2024 for EP Application No. 22907767.2.

\* cited by examiner

MOUNTING DEVICE FOR DISPLAY DEVICE

CROSS-REFERENCE TO RELATED APPLICATIONS

This application is a continuation of International Application No. PCT/KR2022/019042 designating the United States, filed on Nov. 29, 2022, in the Korean Intellectual Property Receiving Office and claiming priority to Korean Patent Application No. 10-2021-0177706, filed on Dec. 13, 2021, in the Korean Intellectual Property Office, and to Korean Patent Application No. 10-2022-0045222, filed on Apr. 12, 2022, in the Korean Intellectual Property Office, the disclosures of all of which are incorporated by reference herein in their entireties.

BACKGROUND

1. Field

The disclosure relates to a mounting device for a display device.

2. Description of Related Art

With the development of various types of display devices (e.g., mobile phones, tablets, or televisions (TVs)), mounting devices for display devices are being developed. Accordingly, a demand for a mounting device for a display device with various functions (e.g., a sliding function or swivel function of a display device) is increasing.

SUMMARY

Embodiments of the disclosure may provide a mounting device for a display device which may provide a height and an angle of the display device suitable for a use environment of a user.

According to various example embodiments, a mounting device for a display device includes: a driving plate including a first surface and a second surface opposite to the first surface and configured to move integrally with the display device based on the display device being attached to the first surface, a body plate disposed in parallel with the driving plate to contact at least a portion of the second surface of the driving plate and including a slide lock configured to restrict a linear movement of the driving plate, and a stand plate disposed on a surface opposite to a surface of the body plate coupled to the driving plate. The slide lock may be configured to remain locked in a ground mode in which the body plate and the stand plate overlap each other, and may be configured to be unlocked in a stand mode in which the body plate and the stand plate are spaced apart from each other.

According to various example embodiments, a mounting device for a display device includes: a driving plate including a first surface and a second surface opposite to the first surface and configured to move integrally with the display device based on the display device being attached to the first surface, a body plate disposed in parallel with the driving plate to contact at least a portion of the second surface of the driving plate, and a stand plate disposed on a surface opposite to a surface of the body plate coupled to the driving plate and configured to contact at least one edge of the body plate. The body plate may include a swivel lock configured to fix an angle between the driving plate and the body plate based on linear movement of the driving plate and to restrict a swiveling of the display device in a lower end of the mounting device.

According to various example embodiments, a mounting device for a display device includes: a driving plate including a first surface and a second surface opposite to the first surface and configured to move integrally with the display device based on the display device being attached to the first surface, a body plate disposed in parallel with the driving plate to contact at least a portion of the second surface of the driving plate and including a slide lock configured to restrict a linear movement of the driving plate, and a stand plate disposed on a surface opposite to a surface of the body plate coupled to the driving plate and configured to contact at least one edge of the body plate. The slide lock may be configured to remain locked in a ground mode in which the body plate and the stand plate overlap each other, and may be configured to be unlocked in a stand mode in which the body plate and the stand plate are spaced apart from each other by a specified distance or greater with respect to the edge as an axis. The body plate may further include a swivel lock configured to fix an angle between the driving plate and the body plate based on linear movement of the driving plate, and a slip lock configured to restrict the driving plate from slipping from an upper end of the body plate to a lower end of the body plate.

According to various example embodiments, it may be possible to easily attach and detach a mounting device to and from a display device. According to various example embodiments, a mounting device may be fastened compatibly with display devices of various sizes, and may operate by recognizing the size of the display device. According to various example embodiments, a user of a display device may easily adjust an eye level and an angle to suit a user's environment. The effects of an electronic device according to various embodiments are not limited to the above-mentioned effects, and other unmentioned effects can be clearly understood from the following description by one of ordinary skill in the art.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
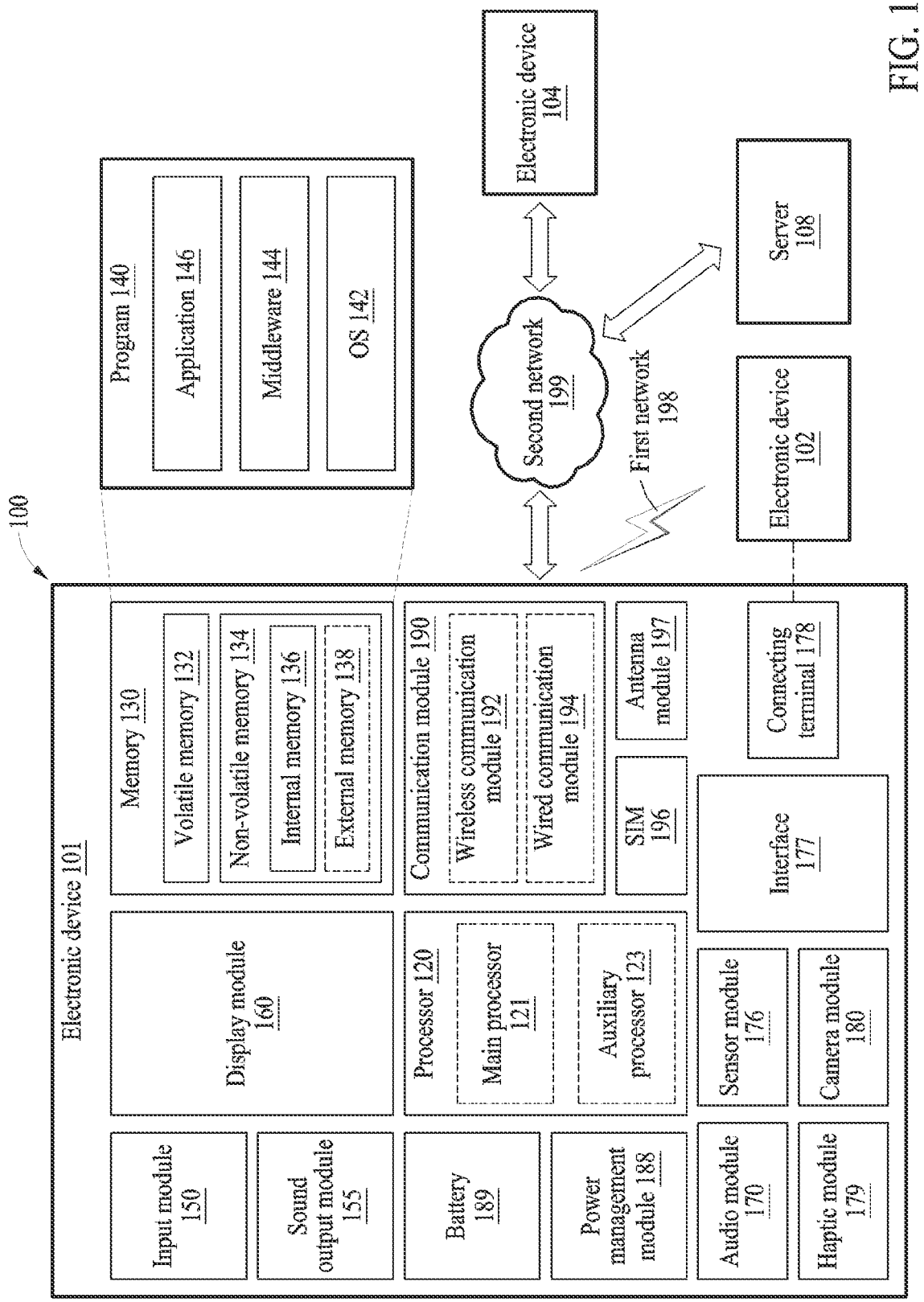
FIG. 1 is a block diagram illustrating an example electronic device in a network environment according to various embodiments.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the above components may be omitted from the electronic device 101, or one or more other components may be added to the electronic device 101. In various embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An artificial intelligence model may be generated by machine learning. Such learning may be performed by, for example, the electronic device 101 in which artificial intelligence is performed, or performed via a separate server (e.g., the server 108). A learning algorithm may include, but is not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an embodiment, the display device 160 may include a touch sensor adapted to sense a touch, or a pressure sensor adapted to measure an intensity of a force incurred by the touch.

The audio module 170 may convert a sound into an electric signal or vice versa. According to an embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local region network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide region network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to embodiments, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology. The electronic device according to embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an embodiment of the disclosure, the electronic device is not limited to those described above. It should be appreciated that embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof. Terms such as "1st" and "2nd," or "first" and "second" may be used to simply distinguish a corresponding component from other components, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., by wire), wirelessly, or via a third element.

As used in connection with embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Embodiments of the present disclosure as set forth herein may be implemented as software (e.g., the program 140)

including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 2A:
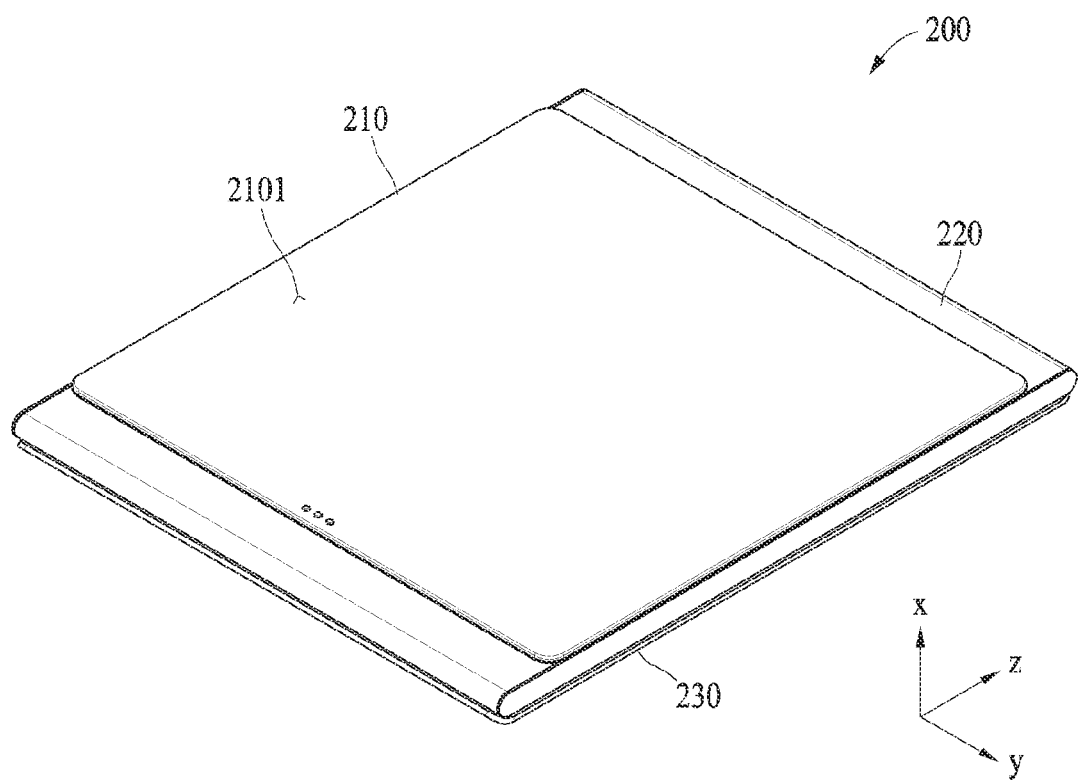
FIG. 2A is a perspective view illustrating a front surface of a mounting device in a ground mode of the mounting device according to various embodiments.
Figure 2B:
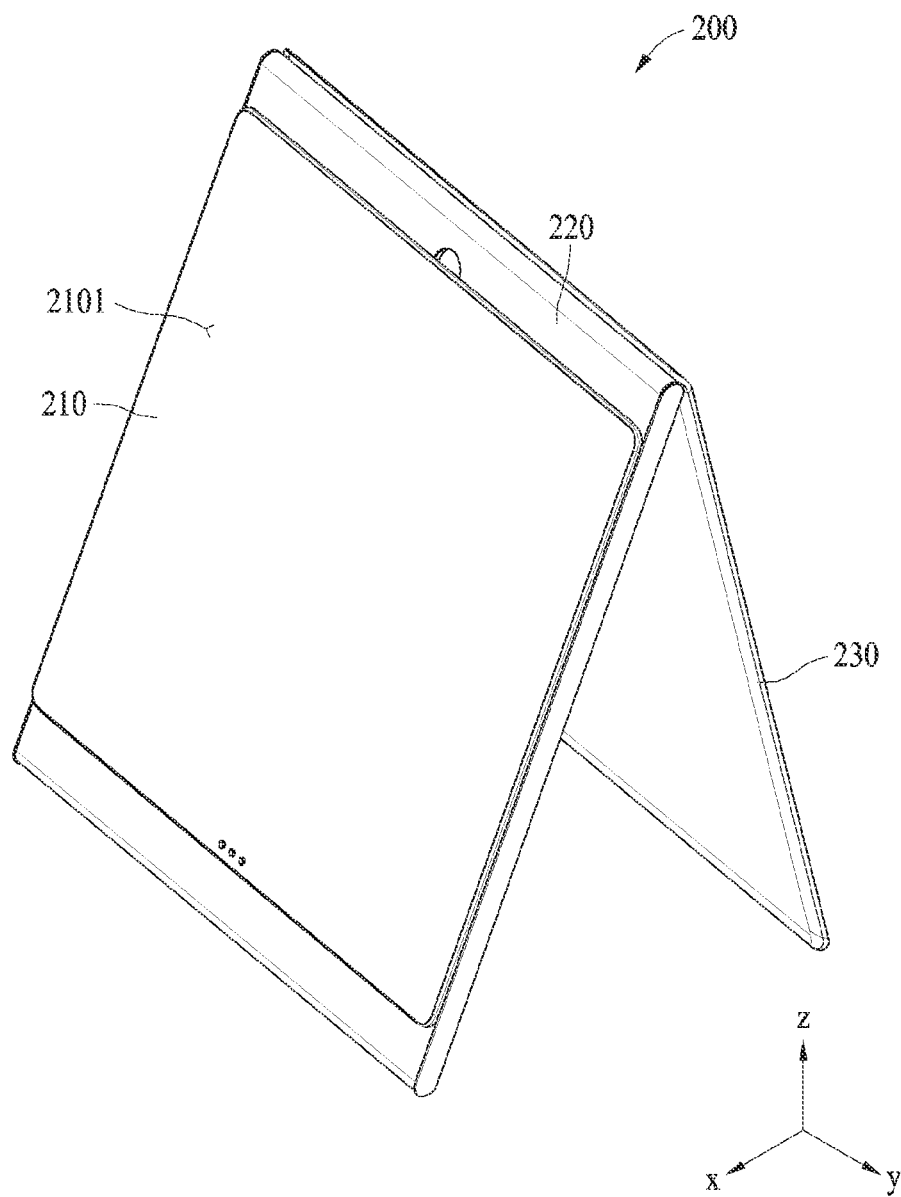
FIG. 2B is a perspective view illustrating a front surface of a mounting device in a stand mode of the mounting device according to various embodiments.
Figure 2C:
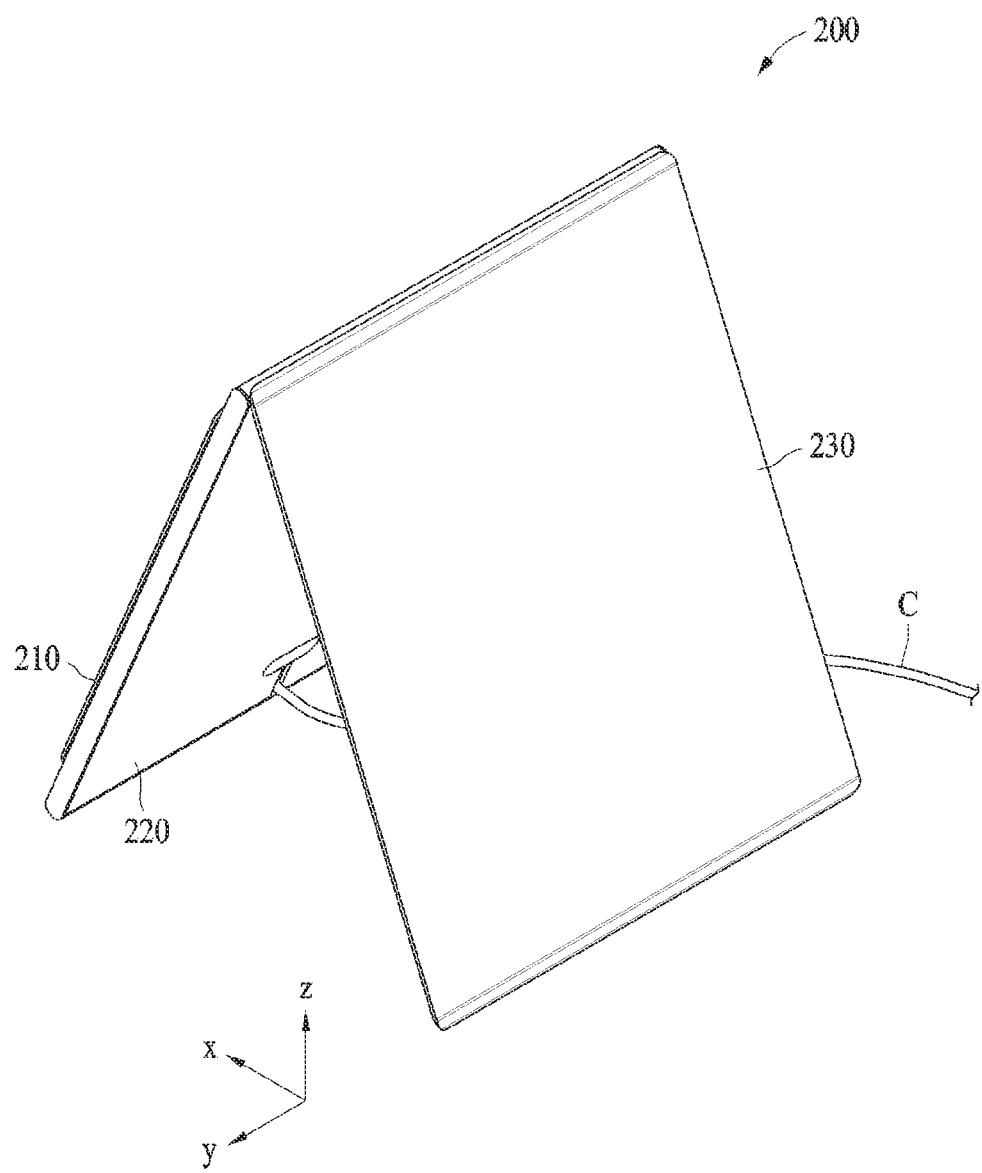
FIG. 2C is a perspective view illustrating a rear surface of a mounting device in a stand mode of the mounting device according to various embodiments.

FIG. 2A illustrates a ground mode of a mounting device 200 according to various embodiments, and FIGS. 2B and 2C illustrate a stand mode of the mounting device 200 according to various embodiments.

In an embodiment, the mounting device 200 may be an electronic device (e.g., the electronic device 101 of FIG. 1) that includes a charging unit, a device identification unit, and a speaker. Referring to FIGS. 2A, 2B and 2C (which may be referred to as FIGS. 2A to 2C), the mounting device 200 according to an embodiment may include a driving plate 210, a body plate 220, and a stand plate 230. The mounting device 200 according to an embodiment may be maintained in a ground mode (e.g., the ground mode of FIG. 2A) in which the body plate 220 and the stand plate 230 overlap each other, or in a stand mode (e.g., the stand mode of FIGS. 2B and 2C) in which the body plate 220 and the stand plate 230 are spaced apart from each other.

In the ground mode according to an embodiment, the stand plate 230 of the mounting device 200 may be disposed in contact with a ground. In the stand mode according to an embodiment, an edge of the body plate 220 of the mounting device 200 and an edge of the stand plate 230 may be disposed in contact with the ground. In an embodiment, the driving plate 210 may include a first surface 2101, and a second surface opposite to the first surface 2101. In an embodiment, the body plate 220 may be disposed in parallel with the driving plate 210 to contact at least a portion of the second surface of the driving plate 210. In an embodiment, the stand plate 230 may be disposed in parallel with the driving plate 210 to contact at least a portion of a surface opposite to a surface of the body plate 220 in contact with the driving plate 210.

In an embodiment, a power supply cable C may be connected to the body plate 220. The power supply cable C may supply power to the mounting device 200. The body plate 220 and the power supply cable C may be connected by a wireless charging scheme or various connection schemes (e.g., a magnetism-based connection scheme, an interference fitting scheme, a pin connection scheme, or a pogo pin connection scheme).

Figure 3A:
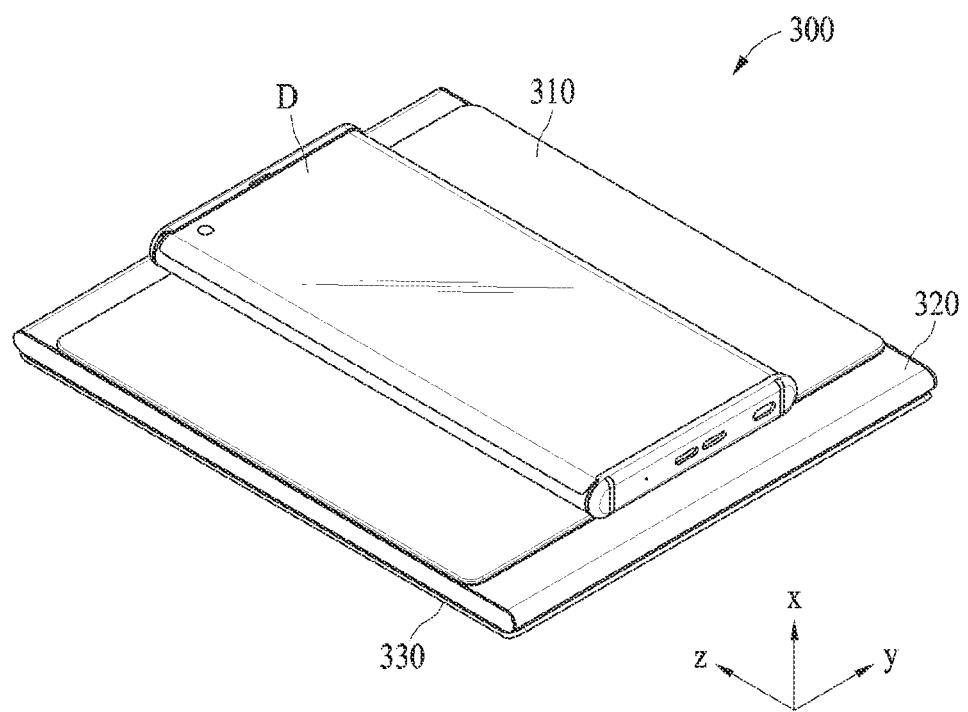
FIG. 3A is a perspective view illustrating a front surface of a mounting device in a ground mode in a state in which a display device is attached to the mounting device according to various embodiments.
Figure 3B:
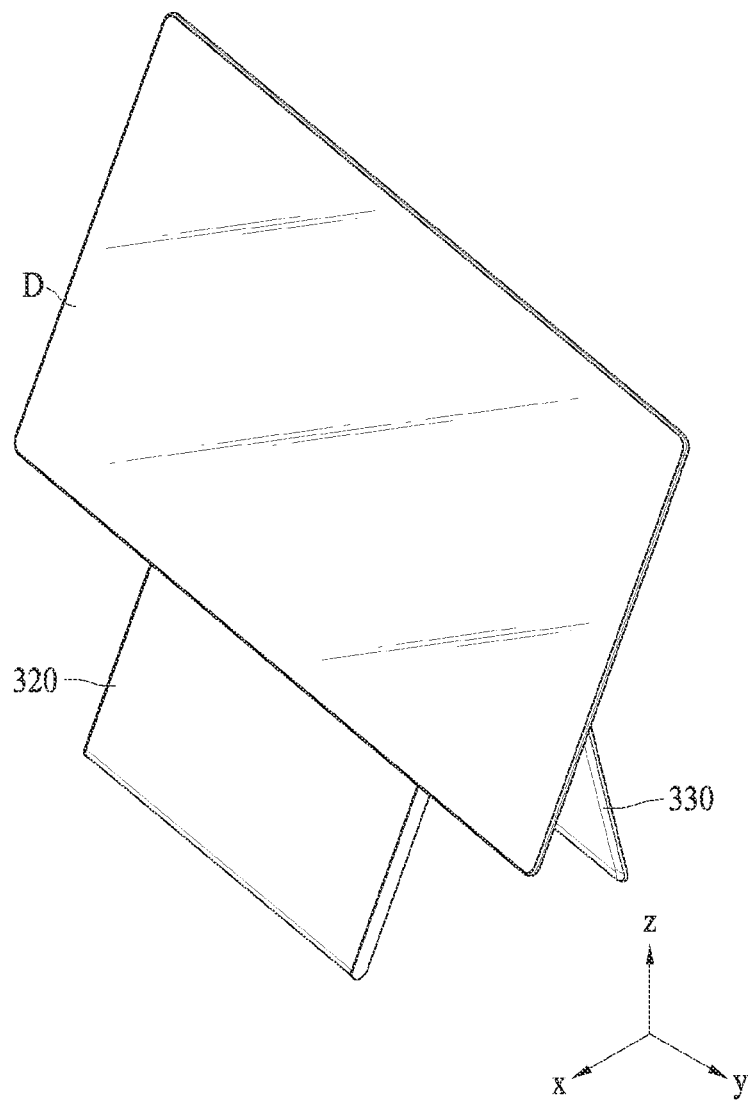
FIG. 3B is a perspective view illustrating a front surface of a mounting device in a stand mode in a state in which a display device is attached to the mounting device according to various embodiments.
Figure 3C:
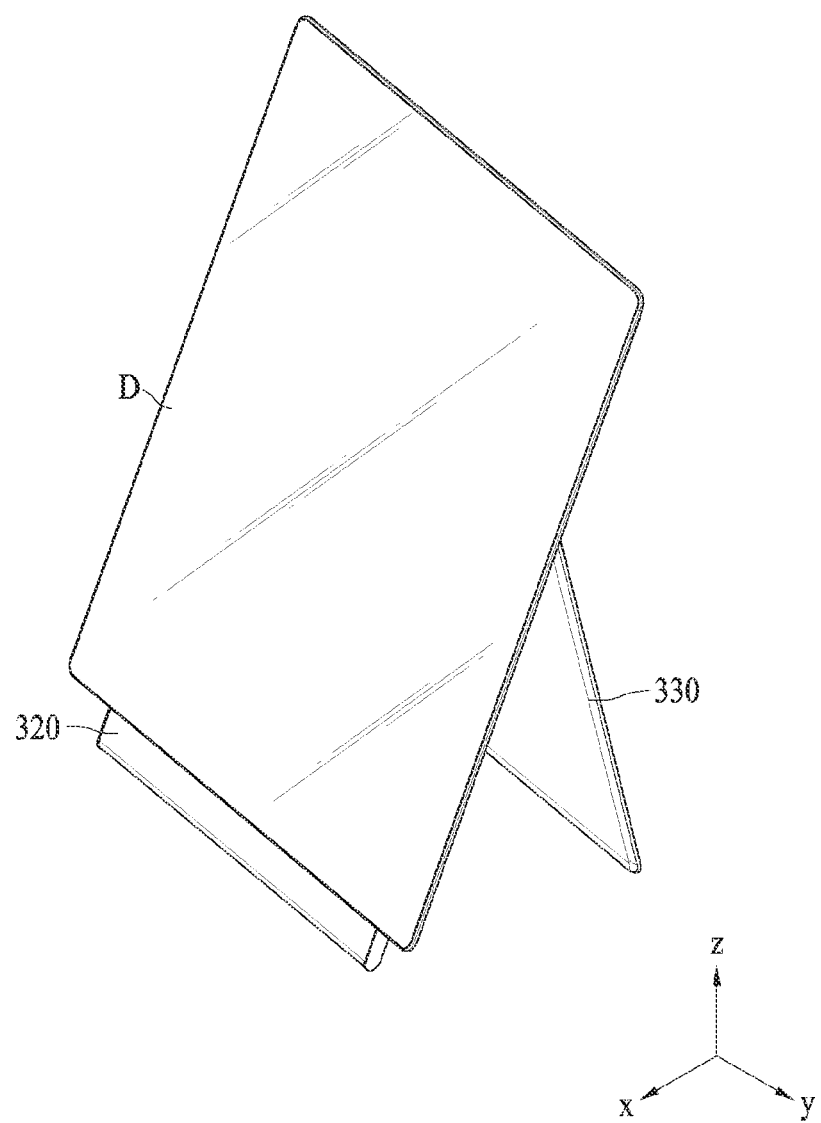
FIG. 3C is a perspective view illustrating a front surface of a mounting device in a stand mode in a state in which a display device is attached to the mounting device and is rotated according to various embodiments.

FIGS. 3A, 3B and 3C are perspective views illustrating various states in which a display device D attached to a mounting device 300 (e.g., the mounting device 200 of FIGS. 2A to 2C) according to various embodiments.

Referring to FIGS. 3A, 3B and 3C (which may be referred to as FIGS. 3A to 3C), the display device D may be attached to the mounting device 300 (e.g., the mounting device 200 of FIG. 2A) according to an embodiment. The display device D according to an embodiment may include a device (e.g., a cellphone, a tablet, a monitor, a television (TV)) including a display module (e.g., the display module 160 of FIG. 1).

If the mounting device 300 is disposed in a ground mode, as shown in FIG. 3A, the display device D according to an embodiment may be disposed on a first surface (e.g., the first surface 2101 of FIG. 2A) of a driving plate 310 (e.g., the driving plate 210 of FIG. 2A) of the mounting device 300.

If the mounting device 300 is disposed in a stand mode, as shown in FIGS. 3B and 3C, the display device D according to an embodiment may be disposed on the first surface (e.g., the first surface 2101 of FIG. 2A) of the driving plate 310 (e.g., the driving plate 210 of FIG. 2A) of the mounting device 300.

In an embodiment, the display device D disposed on the first surface (e.g., the first surface 2101 of FIG. 2A) of the driving plate 310 of the mounting device 300 may be attached to the first surface 2101 of the driving plate 310 and moved integrally with the driving plate 310. In an embodiment, the display device D may be rotated together with the driving plate 310 about a direction perpendicular to the first surface 2101 of the driving plate 310 as an axis.

In an embodiment, before the display device D is rotated, a horizontal length of the display module (e.g., the display module 160 of FIG. 1) may be greater than a vertical length of the display module, as shown in FIG. 3B. After the display device D is rotated, the horizontal length of the display module (e.g., the display module 160 of FIG. 1) may be less than the vertical length.

Figure 4A:
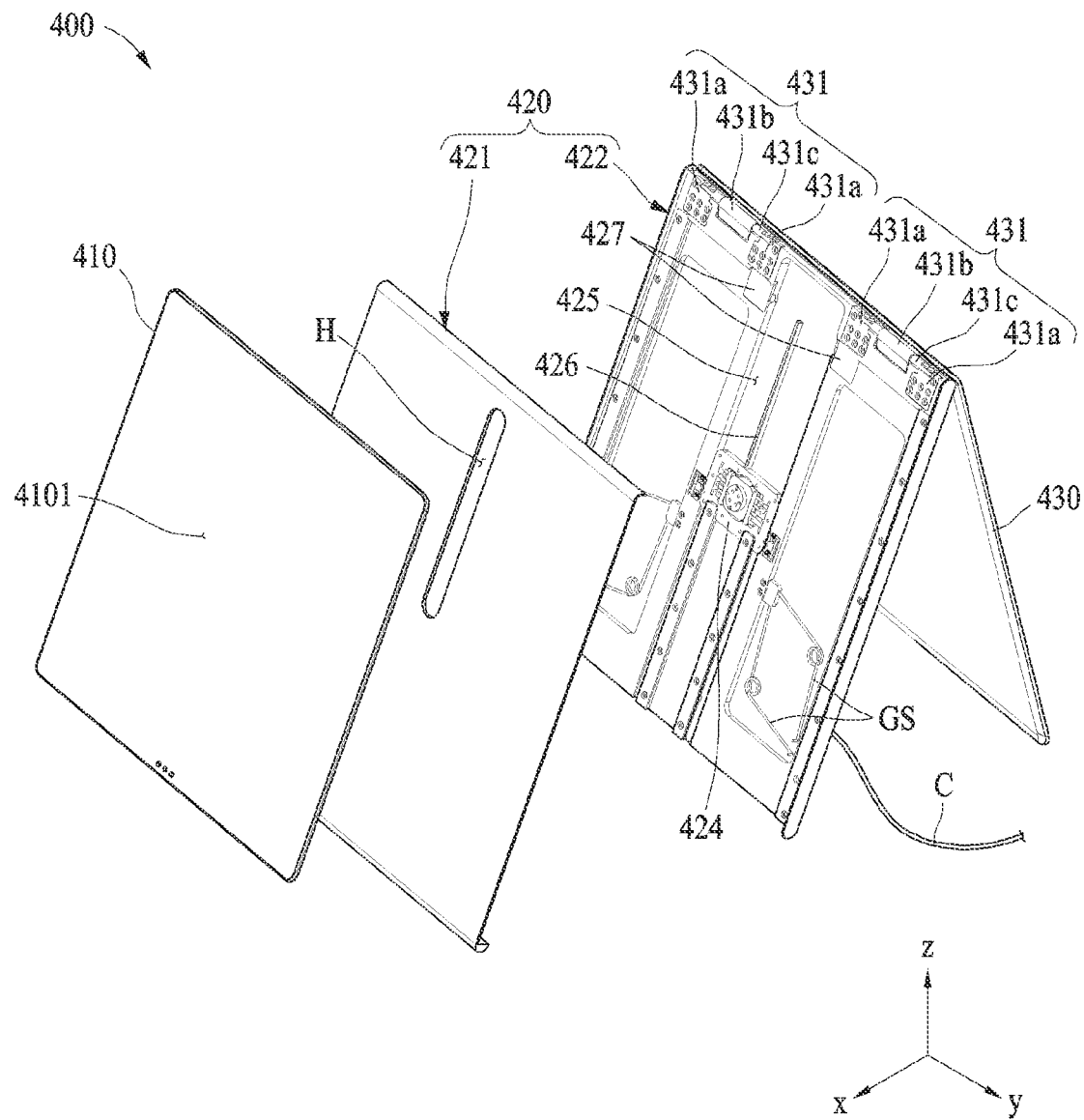
FIG. 4A is an exploded perspective view illustrating a front surface of a mounting device in a stand mode according to various embodiments.
Figure 4B:
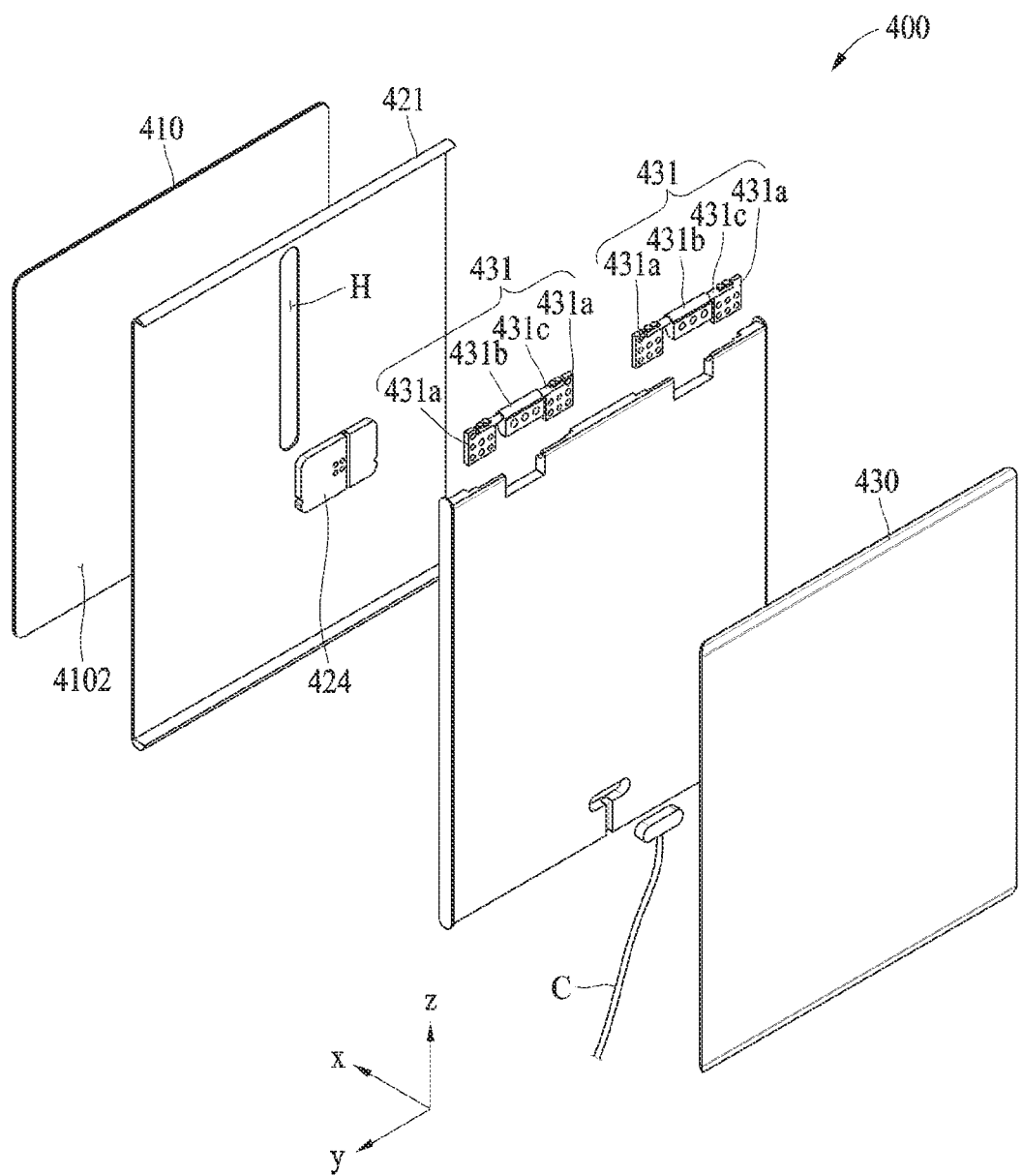
FIG. 4B is an exploded perspective view illustrating a rear surface of a mounting device in a stand mode according to various embodiments.

In an embodiment, the mounting device 300 may have a structure for charging the display device D with power. For example, the mounting device 300 may include a wired charging structure (e.g., a charging structure by a pogo pin connection) and/or a wireless charging structure. FIGS. 4A and 4B are exploded perspective views illustrating a front surface of a mounting device 400 (e.g., the mounting device 200 of FIGS. 2A to 2C and/or the mounting device 300 of FIGS. 3A to 3C) in a stand mode according to various embodiments, and a rear surface of the mounting device 400 according to various embodiments, respectively.

Referring to FIGS. 4A and 4B, the mounting device 400 (e.g., the mounting device 200 of FIGS. 2A to 2C and/or the mounting device 300 of FIGS. 3A to 3C) may include a driving plate 410 (e.g., the driving plate 310 of FIGS. 3A to 3C), a body plate 420 (e.g., the body plate 320 of FIGS. 3A to 3C), and a stand plate 430 (e.g., the stand plate 330 of FIGS. 3A to 3C).

In an embodiment, the driving plate 410 may include a first surface 4101 (e.g., the first surface 3101 of FIG. 3A) and a second surface 4102 opposite to the first surface 4101. In an embodiment, the body plate 420 may be disposed in parallel with the driving plate 410 to contact at least a portion of the second surface 4102 of the driving plate 410. In an embodiment, the body plate 420 may include a housing 421 and a body frame 422. In an embodiment, the housing 421 may be coupled to the body frame 422 to cover components included in the body plate 420. In an embodiment, the housing 421 may include a slide hole H through which the driving plate 410 and a driving member 424 are coupled to move. The slide hole H according to an embodiment may extend along a linear movement path of the driving member 424. In an embodiment, the body frame 422 may accommodate the components of the body plate 420 (e.g., a locking unit, the driving member 424, a sliding guide 425, a first friction member 426, and a second friction member 427).

In an embodiment, the body plate 420 may further include the driving member 424, the sliding guide 425, the first friction member 426, and the second friction member 427. The first friction member 426 and the second friction member 427 may exert a frictional force on the driving member 424, to restrict a translational motion or a rotational motion when the driving member 424 is driven in the body plate 420. The first friction member 426 and the second friction member 427 according to an embodiment may each be formed of a synthetic resin of a soft material for durability, for example, formed of a material, such as polyoxymethylene (POM), which has a high rigidity and is excellent in resistance to friction and wear resistance. In an embodiment, since the first friction member 426 restricts a rotational movement, that is, swiveling, of the driving member 424 in the body plate 420, the first friction member 426 may also be referred to as a "swivel lock." In an embodiment, since the second friction member 427 restricts a vertical translational movement, that is, slipping, of the driving member 424 in the body plate 420, the second friction member 427 may also be referred to as a "slip lock." The swivel lock and slip lock will be described in greater detail below with reference to FIGS. 5A to 6D below.

In an embodiment, the stand plate 430 may include a hinge unit 431. The hinge unit 431 according to an embodiment may include a first block 431a, a second block 431b, and a hinge shaft 431c. The first block 431a of the hinge unit 431 according to an embodiment may be coupled to the body frame 422 of the body plate 420, and the second block 431b of the hinge unit 431 may be coupled to the stand plate 430. In the hinge unit 431 according to an embodiment, an angle between the first block 431a and the second block 431b about the hinge shaft 431c may change. In an embodiment, the stand plate 430 may be configured to contact an edge of the body plate 420 coupled to the first block 431a of the hinge unit 431. In an embodiment, based on a change in the angle between the first block 431a and the second block 431b, an angle between the body plate 420 coupled to the first block 431a and the stand plate 430 coupled to the second block 431b may also change.

FIGS. 5A, 5B, 5C and 5D are diagrams illustrating a body plate 520 (e.g., the body plate 420 of FIGS. 4A and 4B) of a mounting device (e.g., the mounting device 400 of FIGS. 4A and 4B), and components included in the body plate 520 according to various embodiments.

Figure 5A:
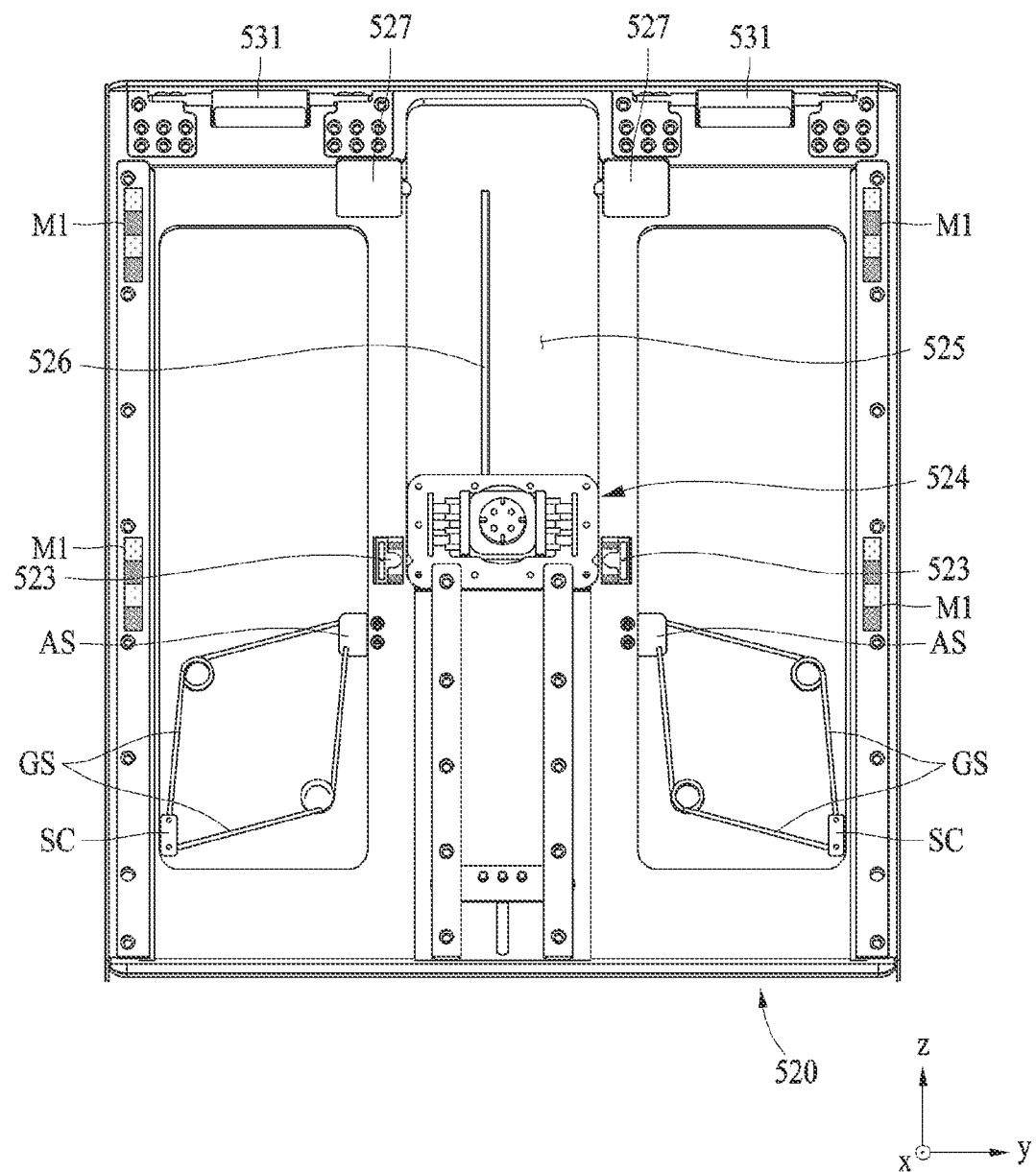
FIG. 5A is a diagram illustrating components in a body plate in a state in which a driving member of a mounting device is in a first position according to various embodiments.
Figure 5B:
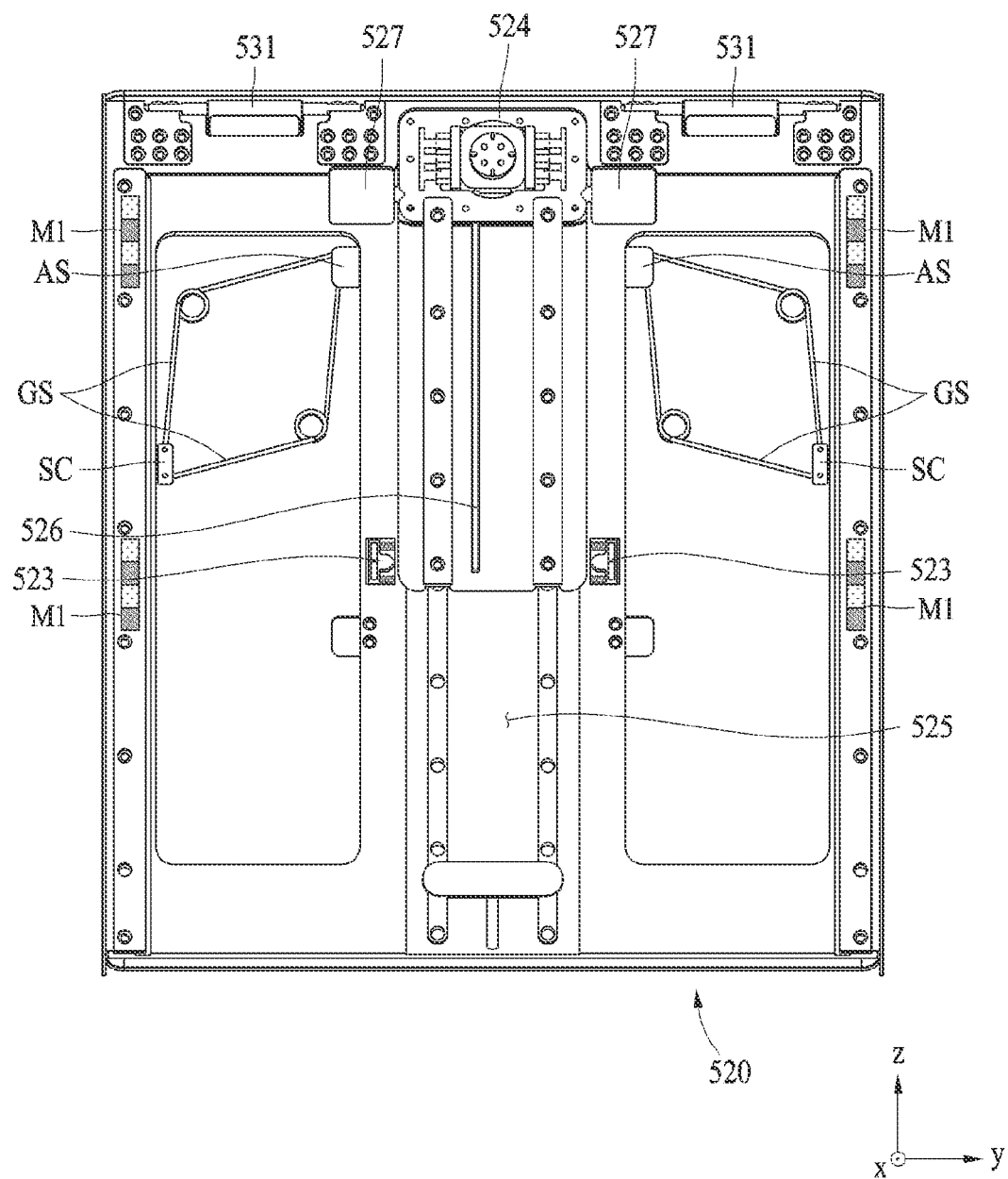
FIG. 5B is a diagram illustrating components in a body plate in a state in which a driving member of a mounting device is in a second position according to various embodiments.

Referring to FIGS. 5A and 5B, the body plate 520 may include a locking unit 523, a driving member 524 (e.g., the driving member 424 of FIGS. 4A and 4B), a sliding guide 525 (e.g., the sliding guide 425 of FIGS. 4A and 4B), a swivel lock 526 (e.g., the first friction member 426 of FIGS. 4A and 4B), and a slip lock 527 (e.g., the second friction member 427 of FIGS. 4A and 4B).

In an embodiment, the locking unit 523 may restrict a display device (e.g., the display device D of FIGS. 3A to 3C) from moving when the mounting device (e.g., the mounting device 400 of FIGS. 4A and 4B) is in a ground mode. Since a locking unit according to an embodiment restricts sliding of the display device D on the body plate 520 when the mounting device 400 is in the ground mode, the locking unit may also be referred to as a "slide lock."

In an embodiment, the driving member 524 may be coupled to a second surface (e.g., the second surface 4102 of FIGS. 4A and 4B) of a driving plate (e.g., the driving plate 410 of FIGS. 4A and 4B) and may move integrally with the driving plate(410) on the body plate 520.

In an embodiment, the sliding guide 525 may be formed to be recessed on a body frame (e.g., the body frame 422 of FIGS. 4A and 4B). The sliding guide 525 may guide a linear movement path of the driving member 524. The sliding guide 525 may include a first position (e.g., a position in which the driving member 524 is disposed in a lower end of the sliding guide 525, as shown in FIG. 5A) in which the driving member 524 is disposed when a contact area between the second surface (e.g., the second surface 4102 of FIGS. 4A and 4B) of the driving plate (e.g., the driving plate 410 of FIGS. 4A and 4B) and the body plate 520 is maximized, and a second position (e.g., a position in which the driving member 524 is disposed in an upper end of the sliding guide 525, as shown in FIG. 5B) in which the driving member 524 is disposed when the contact area between the second surface (e.g., the second surface 4102 of FIGS. 4A and 4B) of the driving plate (e.g., the driving plate 410 of FIGS. 4A and 4B) and the body plate 520 is minimized.

In an embodiment, the swivel lock 526 (e.g., the first friction member 426 of FIGS. 4A and 4B) may be formed to protrude from the sliding guide 525 toward the second surface (e.g., the second surface 4102 of FIGS. 4A and 4B) of the driving plate (e.g., the driving plate 410 of FIGS. 4A and 4B) and may extend along the linear movement path of the driving member 524. The swivel lock 526 according to an embodiment may fix an angle between the driving plate (e.g., the driving plate 410 of FIGS. 4A and 4B) and the body plate 520 (e.g., the body plate 420 of FIGS. 4A and 4B) when the driving plate linearly moves.

Figure 5C:
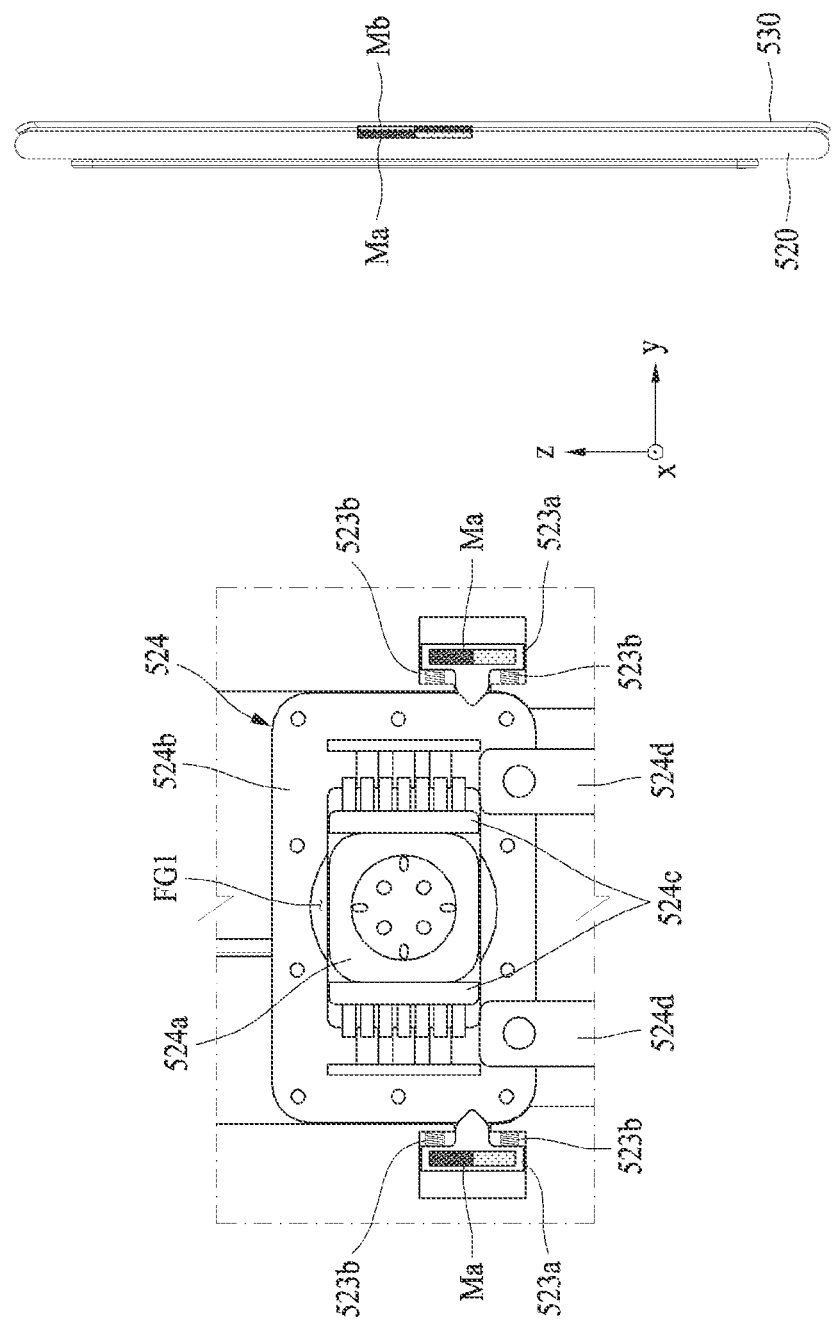
FIG. 5C is a diagram illustrating a state in which a slide lock is fastened to a driving member of a mounting device according to various embodiments.
Figure 5D:
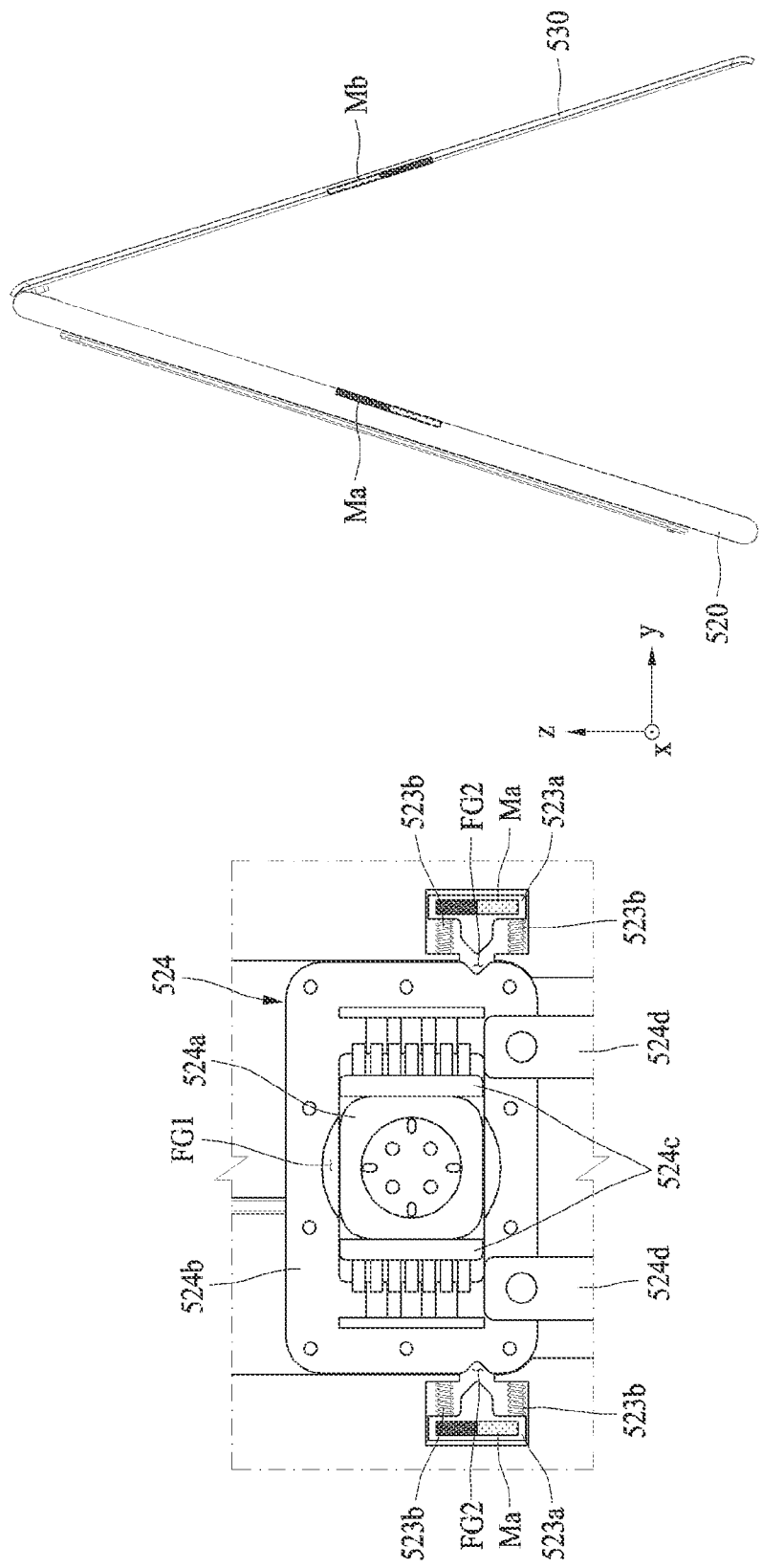
FIG. 5D is a diagram illustrating a state in which a slide lock is released from a driving member of a mounting device according to various embodiments.

In an embodiment, the slip lock 527 (e.g., the second friction member 427 of FIGS. 4A and 4B) may include a protrusion coupled to a locking groove FG2 of the driving member 524 of FIG. 5D when the driving member 524 is disposed in the second position as shown in FIG. 5B. The slip lock 527 according to an embodiment may be coupled to the driving member 524 to prevent and/or restrict slipping of the driving member 524 and/or the driving plate (e.g., the driving plate 410 of FIGS. 4A and 4B) coupled to the driving member 524 when the driving member 524 is in the second position.

The body plate 520 according to an embodiment may be coupled to a first block (e.g., the first block 431a of FIGS. 4A and 4B) of a hinge unit 531 (e.g., the hinge unit 431 of FIGS. 4A and 4B), so that an angle between the body plate 520 and a stand plate (e.g., the stand plate 430 of FIGS. 4A and 4B) may be adjusted with respect to a hinge shaft (e.g., the hinge shaft 431c of FIGS. 4A and 4B).

In an embodiment, the body plate 520 may include at least one pair of guide spring units GS. If the driving member 524 moves (e.g., slides) along a linear movement path between the first position and the second position, the guide spring units GS according to an embodiment may move along a path parallel with the linear movement path of the driving member 524. In an embodiment, the guide spring units GS may include a pair of torsion springs. One end portion of a guide spring unit GS according to an embodiment may include an auxiliary slider AS coupled to the outside of the sliding guide 525, and the other end portion thereof may include a slide coupler SC fastened to a housing (e.g., the housing 421 of FIGS. 4A and 4B) of the body plate 520. In an embodiment, when the display device D coupled to the driving member 524 moves from the first position to the second position, the guide spring unit GS may exert an elastic force in a direction opposite to gravity, to allow the driving member 524 to easily move from the first position to the second position by a semi-automatically operating scheme. A structure of a slide lock (e.g., the locking unit 523 of FIG. 5A) will be described in detail with reference to FIGS. 5C and 5D below. The slide lock 523 may include a locking member 523a and a locking spring 523b. The driving member 524 may include a driving coupling unit 524a, a frame unit 524b, an elastic body 524c, and a height fixing unit 524d. In an embodiment, the frame unit 524b of the driving member 524 may include a rotation groove FG1 and a locking groove FG2.

In an embodiment, when the driving member 524 is disposed in the first position (e.g., a position in which the driving member 524 is disposed in a lower end of the sliding guide 525, as shown in FIG. 5A), the locking member 523a of the slide lock 523 may be engaged with the locking groove FG2 disposed on at least one side of the driving member 524 to restrict the driving member 524 from moving. In an embodiment, the locking spring 523b of the slide lock 523 may be disposed on a side surface of the lock member 523a facing the sliding guide 525 to apply an elastic force to the side surface. In a state in which the locking spring 523b according to an embodiment is compressed, the locking member 523a may be engaged with the locking groove FG2 of the driving member 524. In a state in which the locking spring 523b is extended, the locking member 523a may be disengaged from the locking groove FG2 of the driving member 524.

The locking member 523a according to an embodiment may include a first magnetic body Ma.

The stand plate (e.g., the stand plate 430 of FIGS. 4A and 4B) according to an embodiment may include a second magnetic body Mb at a position corresponding to a position of the first magnetic body Ma of the locking member 523a in the state in which the locking spring 523b is compressed. In an embodiment, a pulling force (e.g., an attractive force) may act between the first magnetic body Ma and the second magnetic body Mb. In an embodiment, in a ground mode (e.g., the ground mode of FIG. 2A) in which the body plate 520 including the slide lock 523 including the first magnetic body Ma overlaps the stand plate (e.g., the stand plate 430 of FIGS. 4A and 4B) including the second magnetic body Mb, the locking spring 523b may remain compressed due to a sufficient attractive force acting between the first magnetic body Ma and the second magnetic body Mb, and the slide lock 523 may remain locked, to restrict the driving member 524 from moving (e.g., sliding). In an embodiment, in a stand mode (e.g., the stand mode of FIG. 2B and/or 2C) in which the body plate 520 including the slide lock 523 including the first magnetic body Ma is spaced apart from the stand plate (e.g., the stand plate 430 of FIGS. 4A and 4B) including the second magnetic body Mb, the locking spring 523b may remain extended due to a decrease in the attractive force acting between the first magnetic body Ma and the second magnetic body Mb, and the slide lock 523 may be unlocked, to allow the driving member 524 to freely move (e.g., slide).

FIGS. 6A, 6B, 6C and 6D include diagrams and a perspective view of a driving member 624 of a mounting device (e.g., the mounting device 200 of FIGS. 2A to 2C, and/or the mounting device 400 of FIGS. 4A and 4B) based on various angles and states according to various embodiments. Hereinafter, the driving member 624 (e.g., the driving member 524 of FIGS. 5A to 5C), a swivel lock 626 (e.g., the swivel lock 526 of FIGS. 5A to 5C) and a slip lock 627 (e.g., the slip lock 527 of FIGS. 5A to 5C) will be described in detail with reference to FIGS. 6A, 6B, 6C and 6D (which may be referred to as FIGS. 6A to 6D).

Figure 6A:
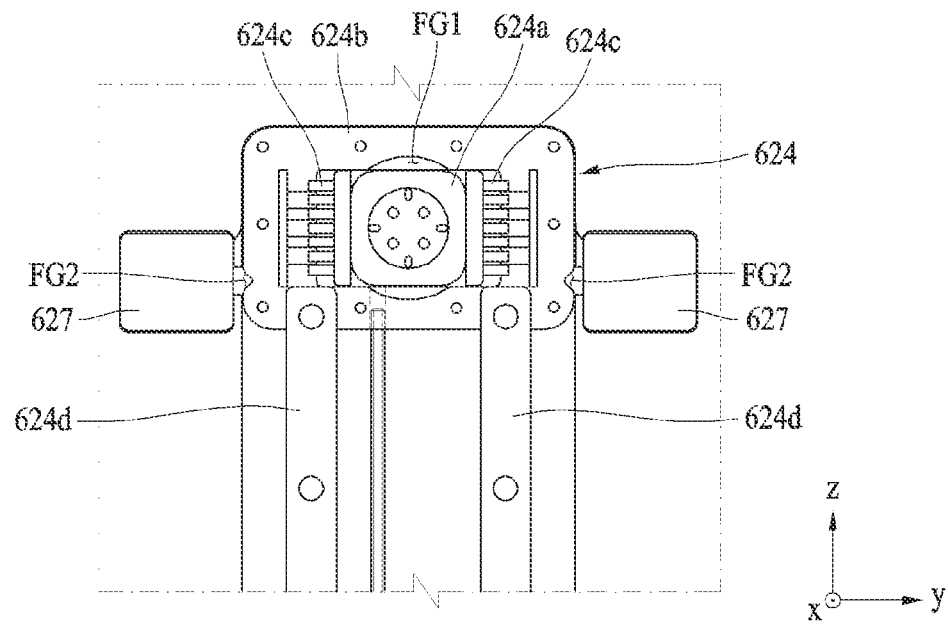
FIG. 6A is a front view of a driving member of a mounting device according to various embodiments.
Figure 6B:
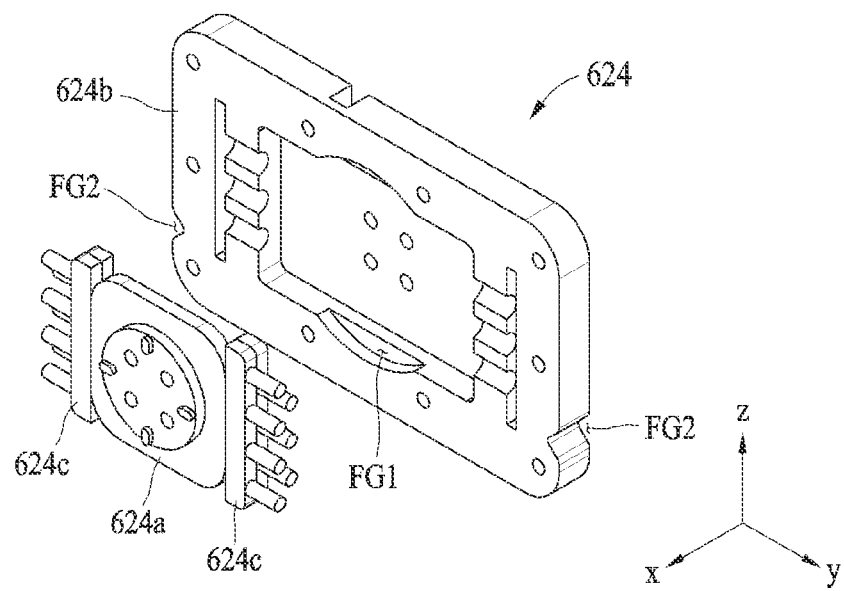
FIG. 6B is an exploded perspective view of a driving member of a mounting device according to various embodiments.

Referring to FIGS. 6A and 6B, the driving member 624 according to an embodiment may include a driving coupling unit 624a (e.g., the driving coupling unit 524a of FIGS. 5C and 5D), a frame unit 624b (e.g., the frame unit 524a of FIGS. 5C and 5D), an elastic body 624c (e.g., the elastic body 524c of FIGS. 5C and 5D), and a height fixing unit 624d (e.g., the height fixing unit 524d of FIGS. 5C and 5D).

In an embodiment, the driving coupling unit 624a may be coupled to a second surface (e.g., the second surface 4102 of FIGS. 4A and 4B) of a driving plate (e.g., the driving plate 410 of FIGS. 4A and 4B). In an embodiment, the driving coupling unit 624a may have a regular polygonal shape. In an embodiment, the driving coupling unit 624a may have a square shape.

In an embodiment, the frame unit 624b may be disposed to enclose the driving coupling unit 624a. The frame unit 624b according to an embodiment may linearly move along a sliding guide (e.g., the sliding guide 525 of FIGS. 5A and 5B). The frame unit 624b according to an embodiment may include a rotation groove FG1 for guiding a rotational motion of the driving coupling unit 624a, and the driving coupling unit 624a may be rotated in the rotation groove FG1 of the frame unit 624b. The frame unit 624b according to an embodiment may include a locking groove FG2 that is engaged with a slide lock (e.g., the slide lock 523 of FIGS. 5C and 5D) or a slip lock (e.g., the slip lock 527 of FIGS. 5A and 5B). The slide lock may prevent and/or restrict a linear movement of the driving member 624 when the driving coupling unit 624a is in a first position on a sliding guide (e.g., the slide guide 525 of FIG. 2A) and the slip lock may restrict the driving member 624 from slipping when the driving coupling unit 624a is in a second position on the sliding guide 525.

In an embodiment, the elastic body 624c may be disposed to contact an inner surface of the frame unit 624b and both side surfaces of the driving coupling unit 624a. The elastic body 624c according to an embodiment may be configured to be elastically deformed between the driving coupling unit 624a and the frame unit 624b.

In an embodiment, the height fixing unit 624*d* (e.g., the height fixing unit 524*d* of FIGS. 5C and 5D) may be coupled to the frame unit 624*b* and may extend in one direction (e.g., a direction from the second position of the sliding guide 525 of FIG. 5B to the first position of the sliding guide 525 of FIG. 5A). If one end portion of the height fixing unit 624*d* according to an embodiment is in contact with a jaw (not shown) formed in one end portion of the sliding guide (e.g., the sliding guide 525 of FIG. 5A), a linear movement of the driving member 624 in the one direction (e.g., the direction from the second position of the sliding guide 525 of FIG. 5B to the first position of the sliding guide 525 of FIG. 5A) may be stopped.

Figure 6C:
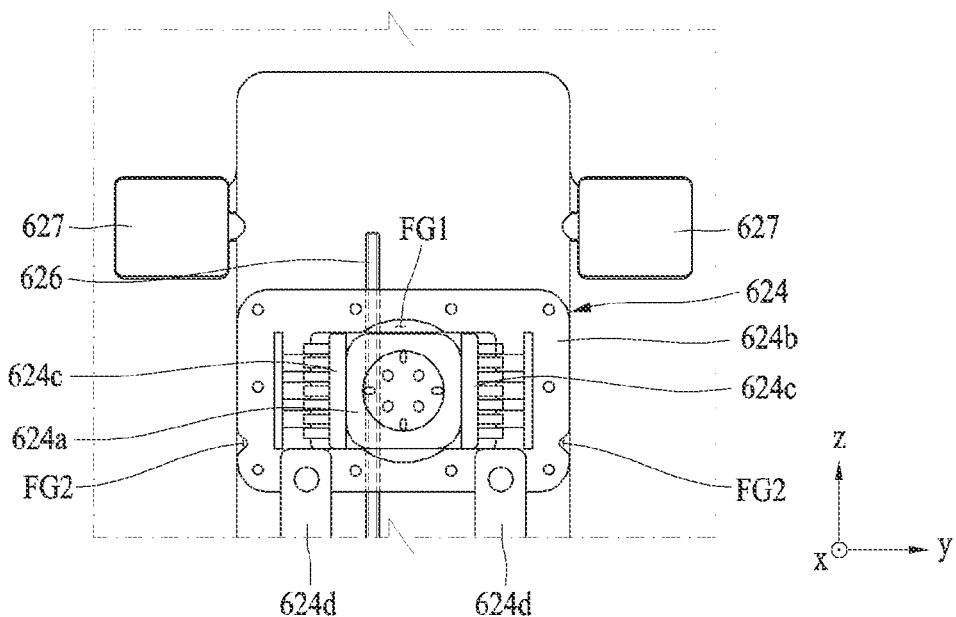
FIG. 6C is a diagram illustrating a state in which a swivel lock is fastened to a driving member of a mounting device according to various embodiments.
Figure 6D:
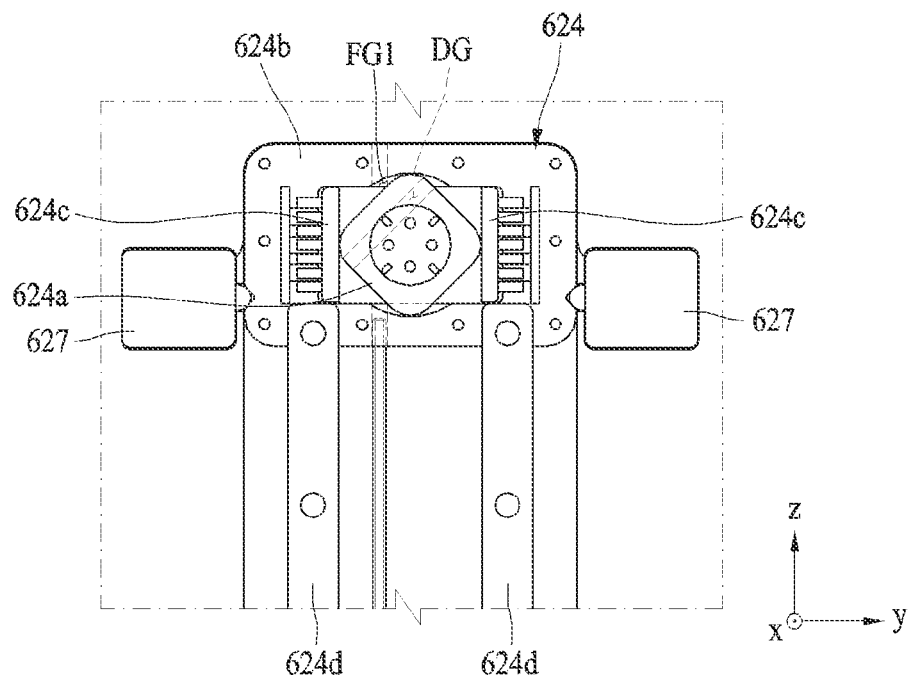
FIG. 6D is a diagram illustrating a state in which a driving coupling unit rotates when a swivel lock is released from a driving member of a mounting device according to various embodiments.

Referring to FIGS. 6C and 6D, the driving member 624 may further include a swivel lock groove DG. The swivel lock groove DG according to an embodiment may be engaged with a swivel lock 626 (e.g., the swivel lock 526 of FIGS. 5A and 5B) of a body plate (e.g., the body plate 520 of FIGS. 5A and 5B). In an embodiment, the swivel lock groove DG may continue to remain engaged with the swivel lock 626 until the driving member 624 reaches a second position on the sliding guide (e.g., the sliding guide 525 of FIG. 5A) from a first position on the sliding guide (e.g., the sliding guide 525 of FIG. 5A) shown in FIG. 6C. Due to such an engagement structure of the swivel lock groove DG and the swivel lock 626, it may be difficult to rotate the driving coupling unit 624*a* until the driving member 624 reaches the second position. This is to prevent and/or reduce a damage to a display device D coupled to the driving member 624. In an embodiment, when the driving member 624 is disposed in the second position on the sliding guide (e.g., the sliding guide 525 of FIG. 5A) as shown in FIG. 6D, the swivel lock groove DG may be disengaged from the swivel lock 626. If the swivel lock groove DG is disengaged from the swivel lock 626, the driving coupling unit 624*a* may be freely rotated in the rotation groove FG1 of the frame unit 624*b*. In an embodiment, when the driving member 624 is disposed in the second position as shown in FIG. 6D, a locking groove FG2 of the driving member 624 of FIG. 6C may be coupled to a protrusion of the slip lock 627 such that the driving member 624 and/or the driving plate (e.g., the driving plate 410 of FIGS. 4A and 4B) coupled to the driving member 624 may be fixed in the second position instead of slipping on a rail guide. In an embodiment, the mounting device 400 may further include a speaker, desirably two or more speakers. If the driving member 624 is disposed in the second position as shown in FIG. 6D, a frame mode of the driving plate 410 coupled to the driving member 624 may be changed to a floating mode on the mounting device 400, so that a speaker according to an embodiment may be activated.

Figure 7:
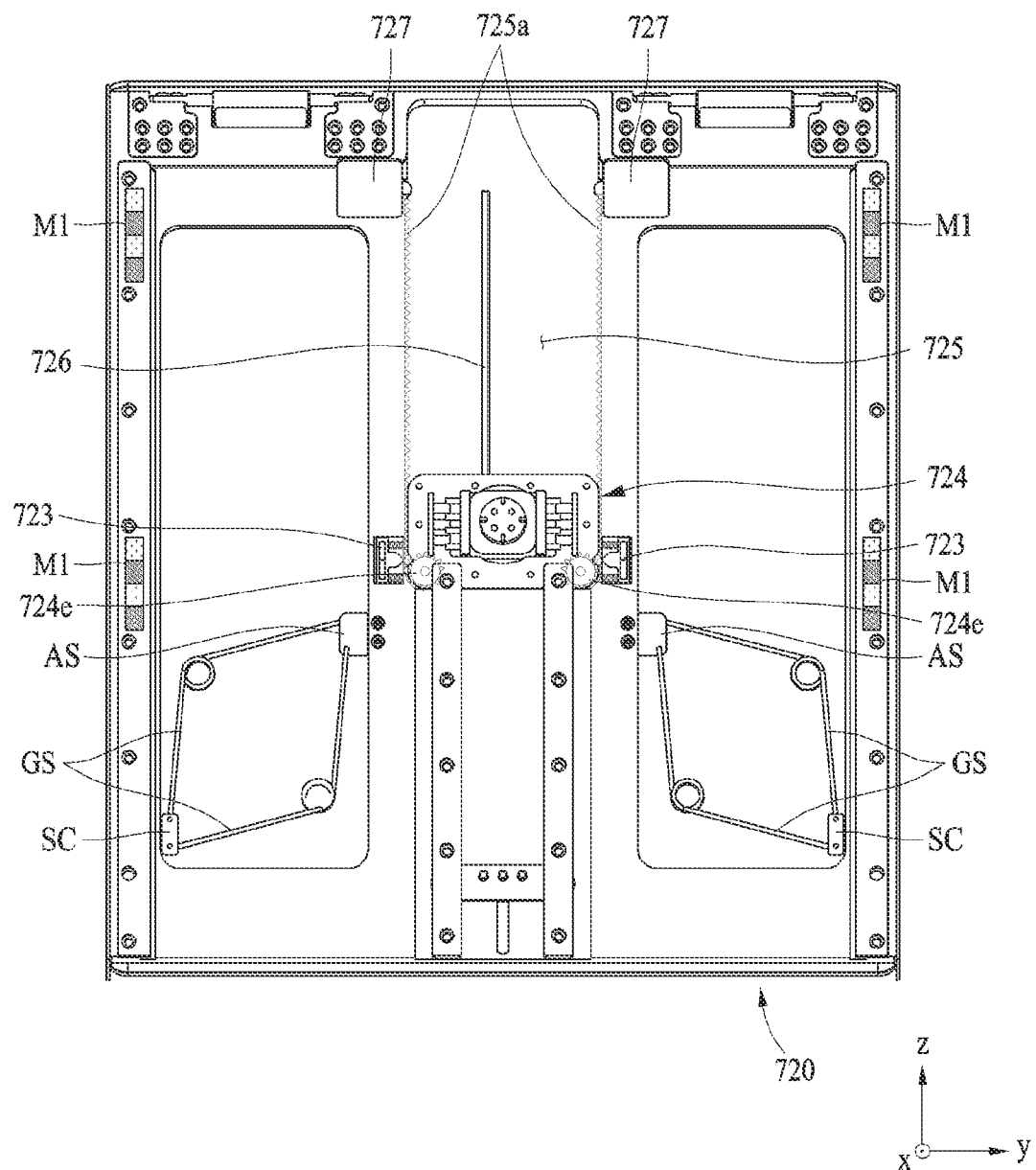
FIG. 7 is a diagram illustrating components in a body plate in a state in which a driving member of a mounting device is in a first position according to various embodiments.

FIG. 7 is a diagram illustrating a body plate 720 (e.g., the body plate 520 of FIG. 5A or 5B) and components included in the body plate 720 (e.g., a slide lock 723, a driving member 724, a sliding guide 725, a swivel lock 726, and a slip lock 727) in a state in which the driving member 724 (e.g., the driving member 624 of FIGS. 6A to 6D) is in a first position according to various embodiments. In an embodiment, the body plate 720 may include the slide lock 723 (e.g., the slide lock 523 of FIGS. 5A and 5B), the driving member 724 (e.g., the driving member 524 of FIGS. 5A and 5B), the sliding guide 725 (e.g., the sliding guide 525 of FIGS. 5A and 5B), the swivel lock 726 (e.g., the swivel lock 526 of FIGS. 5A and 5B), and the slip lock 727 (e.g., the slip lock 527 of FIGS. 5A and 5B).

In an embodiment, the driving member 724 may include a driving coupling unit (e.g., the driving coupling unit 524*a* of FIGS. 5C and 5D), a frame unit (e.g., the frame unit 524*b* of FIGS. 5C and 5D), an elastic body (e.g., the elastic body 524*c* of FIGS. 5C and 5D), and a height fixing unit (e.g., the height fixing unit 524*d* of FIGS. 5C and 5D). In an embodiment, the driving member 724 may further include a sliding gear 724*e*.

In an embodiment, the sliding guide 725 may include a gear rack 725*a*.

In an embodiment, when the driving member 724 moves (e.g., slides) from a first position to a second position on the sliding guide 725, the sliding gear 724*e* of the driving member 724 and the gear rack 725*a* of the sliding guide 725 may be engaged with each other and driven. By an engagement structure of the sliding gear 724*e* and the gear rack 725*a* according to an embodiment, the driving member 724 may be fixed, instead of slipping, at an arbitrary position between the first position and the second position on the sliding guide 725. By the engagement structure of the sliding gear 724*e* and the gear rack 725*a* according to an embodiment, a position in which a display device D attached to a driving plate (e.g., the driving plate 410 in FIGS. 4A and/or 4B) is mounted may be easily adjusted based on a size or shape of the display device D.

Figure 8:
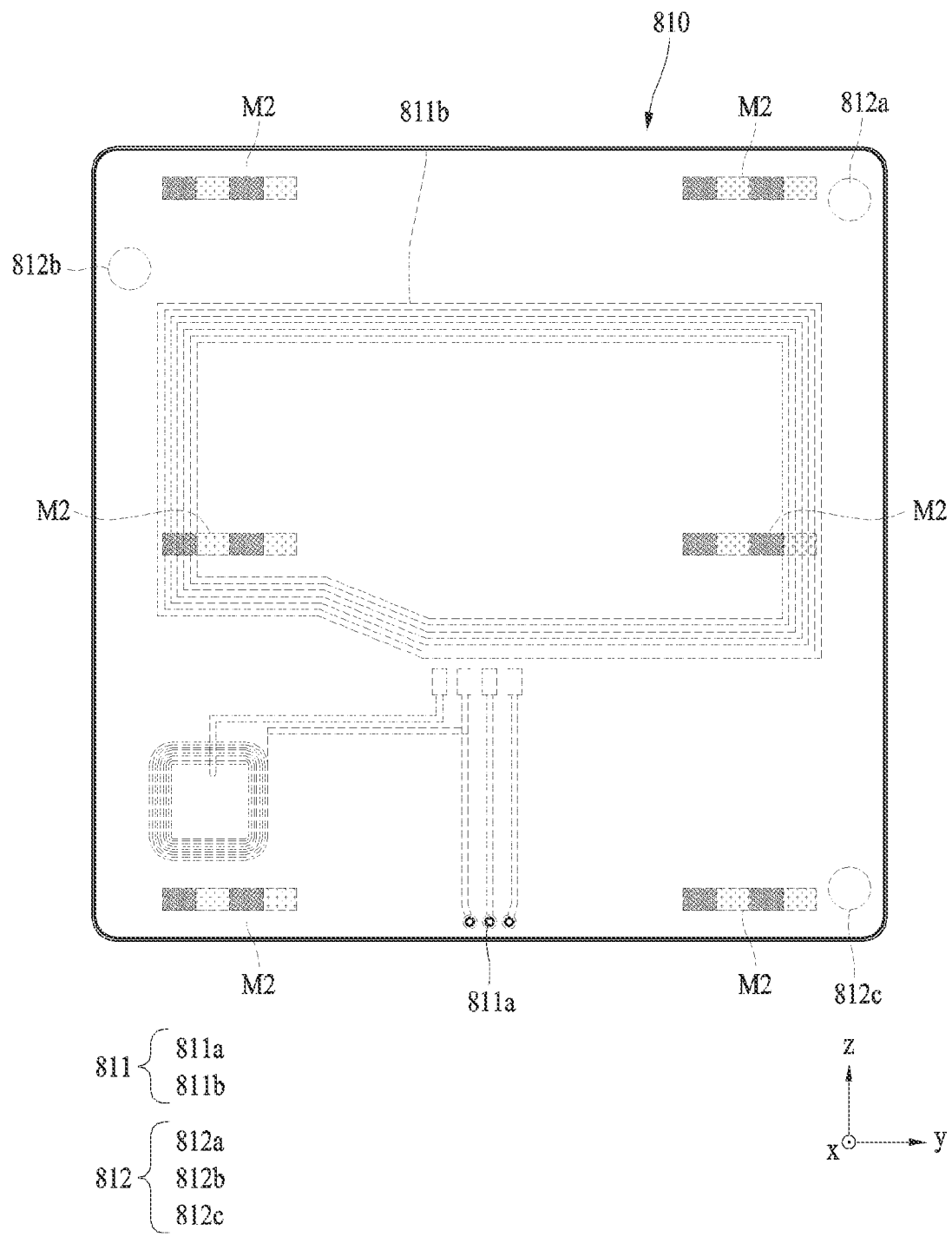
FIG. 8 is a front view of a driving plate of a mounting device according to various embodiments.

FIG. 8 is a front view of a driving plate 810 (e.g., the driving plate 410 of FIGS. 4A and 4B) of a mounting device (e.g., the mounting device 400 of FIGS. 4A and 4B) according to various embodiments. Referring to FIG. 8, the driving plate 810 may include a charging unit 811 and/or a device identification unit 812.

In an embodiment, the charging unit 811 of the driving plate 810 may include a wired charging structure 811*a* and/or a wireless charging structure 811*b*. In an embodiment, the charging unit 811 including the wired charging structure 811*a* may include a terminal (e.g., a pogo pin terminal) in contact with a display device D. In an embodiment, the charging unit 811 including the wireless charging structure 811*b* may include a coil (not shown), a wireless charging integrated circuit (IC) (not shown), a battery (e.g., the battery 189 of FIG. 1), and an external connection terminal (not shown). If power of a battery (e.g., the battery 189 of FIG. 1) of the display device D is discharged or if an amount of available power is less than a designated level, the charging unit 811 with the wired charging structure 811*a* and/or the wireless charging structure 811*b* according to an embodiment may transmit power to charge the battery 189 of the display device D.

In an embodiment, the device identification unit 812 of the driving plate 810 may include a first identification unit 812*a*, a second identification unit 812*b*, and a third identification unit 812*c*. If the display device D is attached to the driving plate 810, each of the first identification unit 812*a*, the second identification unit 812*b*, and the third identification unit 812*c* may identify information (e.g., a type, a size, and a software type) of the attached display device D and may determine whether internal structures of the mounting device (e.g., the mounting device 400 of FIGS. 4A and 4B) are driven. For example, when a display device D having a first size is attached to the driving plate 810 of the mounting device 400, only the first identification unit 812*a* may be activated. When a display device D having a second size is attached to the driving plate 810 of the mounting device 400, the first identification unit 812*a* and the second identification unit 812*b* may be activated together. When a display device D having a third size is attached to the driving plate 810 of the mounting device 400, all of the first identification unit 812*a*, the second identification unit 812*b*, and the third identification unit 812*c* may be activated. The device identification unit 812 according to an embodiment may be, for example, a hall IC unit or a near field communication (NFC) unit, but is not necessarily limited thereto. Although a number of device identification units 812 is limited to three in an embodiment, the number of device identification units 812 and positions of device identification units 812 on the driving plate 810 may vary depending on embodiments.

In an embodiment, the driving plate 810 may further include a magnetic body M2. The magnetic body M2 included in the driving plate 810 may be a double-pole magnet or a multipole magnet, desirably the multipole magnet. An attractive force may act between the magnetic body M2 according to an embodiment and a magnetic body (not shown) embedded in an attachment surface of the display device D. A position of the magnetic body M2 according to an embodiment on the driving plate 810 and a position of the magnetic body embedded in the attachment surface of the display device D may correspond to each other. Accordingly, if the display device D is attached to the driving plate 810, a strong coupling force may be formed. In an embodiment, a magnetic body (not shown) may be further included in a body plate (e.g., the body plate 420 of FIGS. 4A and 4B) in contact with at least a portion of a second surface (e.g., the second surface 4102 of FIG. 4B) of the driving plate 810.

In an embodiment, if the display device D rotates together with the driving plate 810, the magnetic body M2 included in the driving plate 810 and a magnetic body (e.g., the magnetic body M1 of FIG. 7) included in the body plate (e.g., the body plate 720 of FIG. 7) may correspond to each other so that the rotating of the display device D together with the driving plate 810 may be naturally stopped. If a driving member (e.g., the driving member 424 of FIG. 4A) according to an embodiment is disposed in a first position on a sliding guide (e.g., the sliding guide 425 of FIG. 4A), a position of the magnetic body M1 of the body plate (e.g., the body plate 720 of FIG. 7) and a position of the magnetic body M2 of the driving plate 810 may correspond to each other in an arrangement of the body plate (e.g., the body plate 720 of FIG. 7) and the driving plate 810. Due to such a structure, an attractive force may be formed between the magnetic body M1 of the body plate 720 and the magnetic body M2 of the driving plate 810 during a rotational motion of the driving plate 810, to stop the rotation. The magnetic body M1 included in the body plate 720 may be, for example, a double-pole magnet or a multipole magnet, desirably the multipole magnet.

Figure 9:
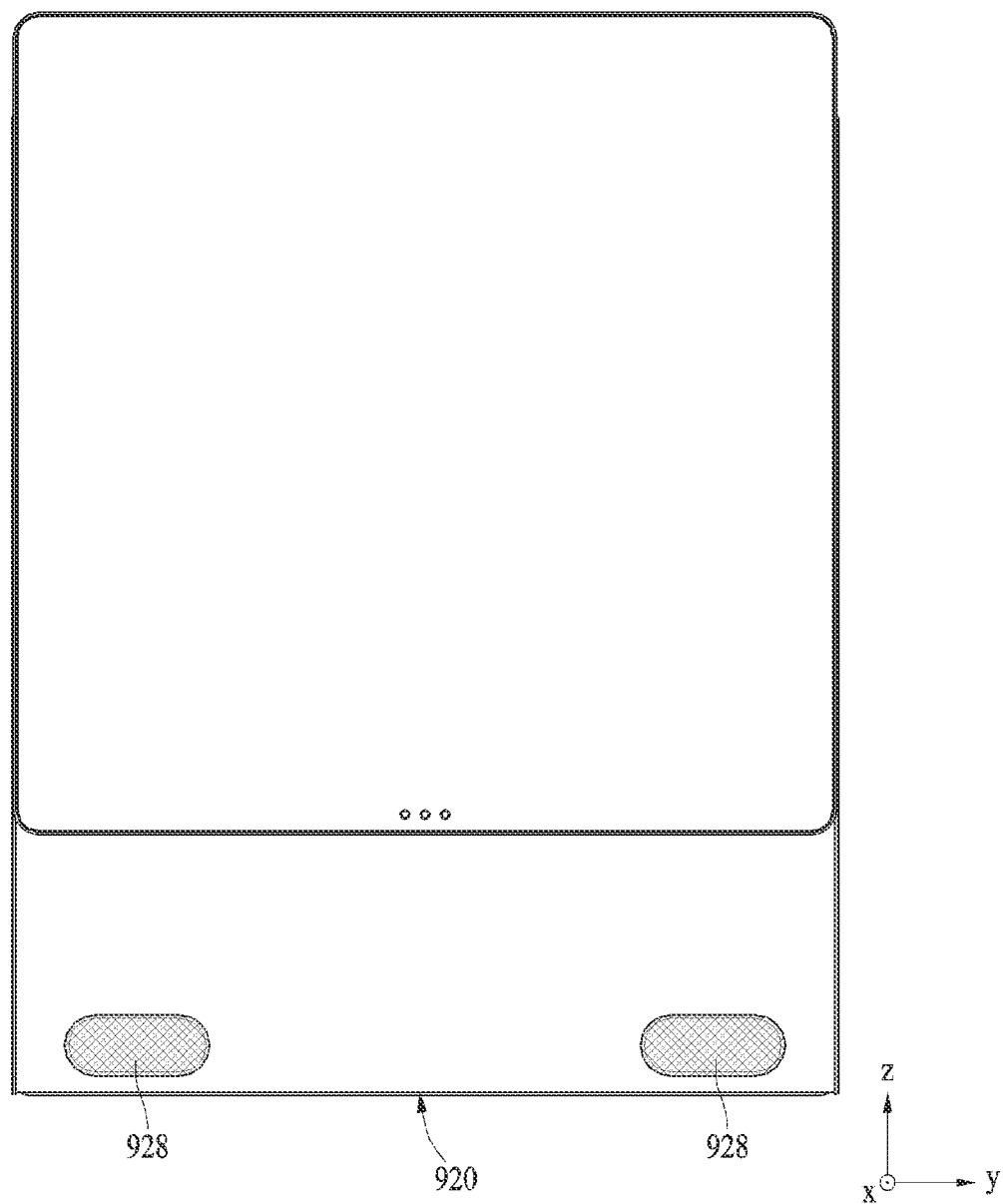
FIG. 9 is a front view illustrating a mounting device in a stand mode according to various embodiments.

FIG. 9 is a front view illustrating a stand mode of a mounting device (e.g., the mounting device 400 of FIGS. 4A and 4B) according to various embodiments. Referring to FIG. 9, a body plate 920 (e.g., the body plate 420 of FIGS. 4A and 4B) of the mounting device 400 may further include a speaker 928. If a driving member (e.g., the driving member 524 of FIGS. 5A and 5B) is in a first position and if a display device D attached to a driving plate (e.g., the driving plate 410 of FIGS. 4A and 4B) coupled to the driving member 524 is maintained in a frame mode on the mounting device 400, the speaker 928 according to an embodiment may remain inactive. If the driving member 524 is in a second position and if the frame mode of the display device D attached to the driving plate 410 coupled to the driving member 524 is changed to a floating mode on the mounting device 400, the speaker 928 may be activated. Although the speaker 928 according to an embodiment is deactivated, a rich sound may be provided in the frame mode by a speaker embedded in the display device D and a speaker at a lower end of the mounting device 400. According to an embodiment, when a mode of the display device D is changed to the floating mode on the mounting device 400, the speaker 928 may provide a three-dimensional (3D) sound with a superior quality, together with a speaker basically included in the display device D. In addition, due to a change to the floating mode, a display image displayed on the display device D may be optimized according to a mode (e.g., a pop-up window output such as a sound equalizer, etc.).

Figure 10:
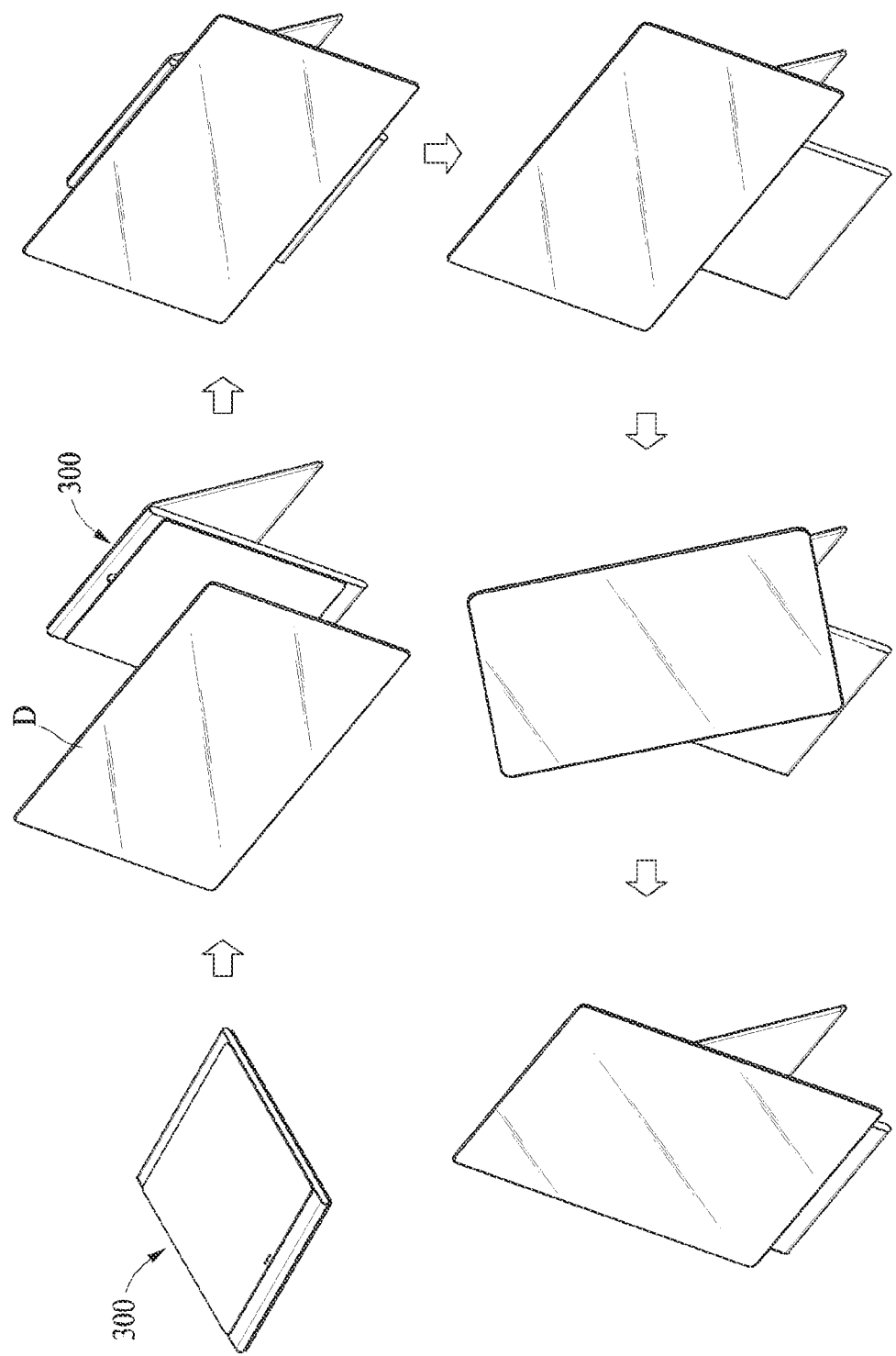
FIG. 10 is a perspective view illustrating an example of driving a mounting device according to various embodiments.

FIG. 10 is a perspective view illustrating an example of driving the mounting device 300 according to various embodiments.

Referring to FIG. 10, the mounting device 300 may be stored and maintained in a state of a ground mode (e.g., the ground mode of FIG. 2A) when not in use. If the mounting device 300 needs to be used, the mounting device 300 may be mounted on the ground using a hinge unit that connects a body plate (e.g., the body plate 320 of FIG. 3B) and a stand plate (e.g., the stand plate 330 of FIG. 3B) of the mounting device 300, to be maintained in a stand mode. A display device D may be attached to a first surface of a driving plate (e.g., the driving plate 310 of FIG. 3B) according to an embodiment, which may be referred to as a standing-view state. The display device D attached to the driving plate (e.g., the driving plate 310 in FIG. 3B) may be slid upwards on the mounting device 300 in the stand mode, which may be referred to as a horizontal floating-view state. The display device D in a state of being slid upwards may be rotated (or swiveled) and vertically mounted, which may be referred to as a vertical floating-view state. If use of the mounting device 300 and the display device D are completed, the mounting device 300 and the display device D may be easily stored by performing the above process in reverse.

In an embodiment, the mounting device (e.g., the mounting device 300 of FIG. 3B) may increase a convenience of use through an interaction with the display device D. Hereinafter, various examples of increasing a convenience of use according to an interaction between the mounting device 300 and the display device D according to an embodiment will be described.

Figure 11:
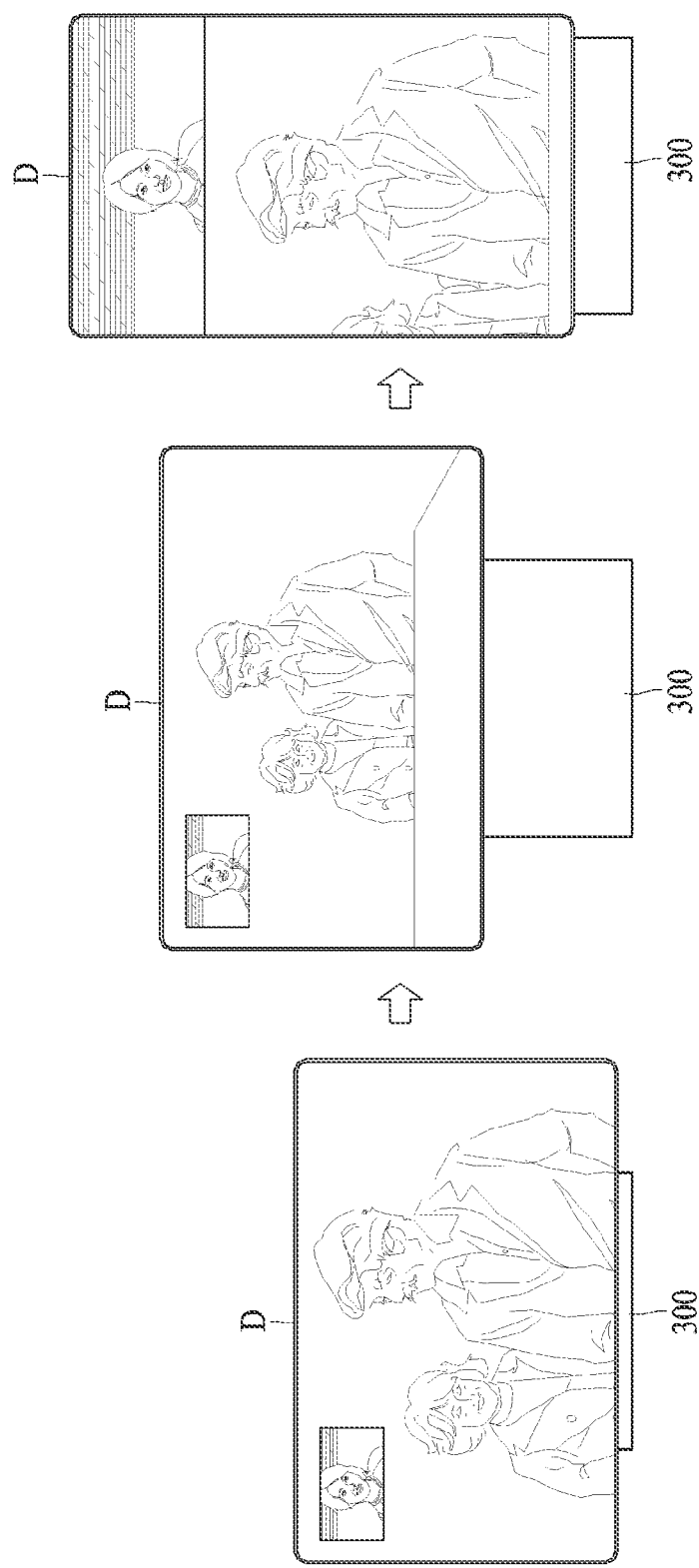
FIG. 11 is a diagram illustrating an example of using a mounting device according to various embodiments.
Figure 12:
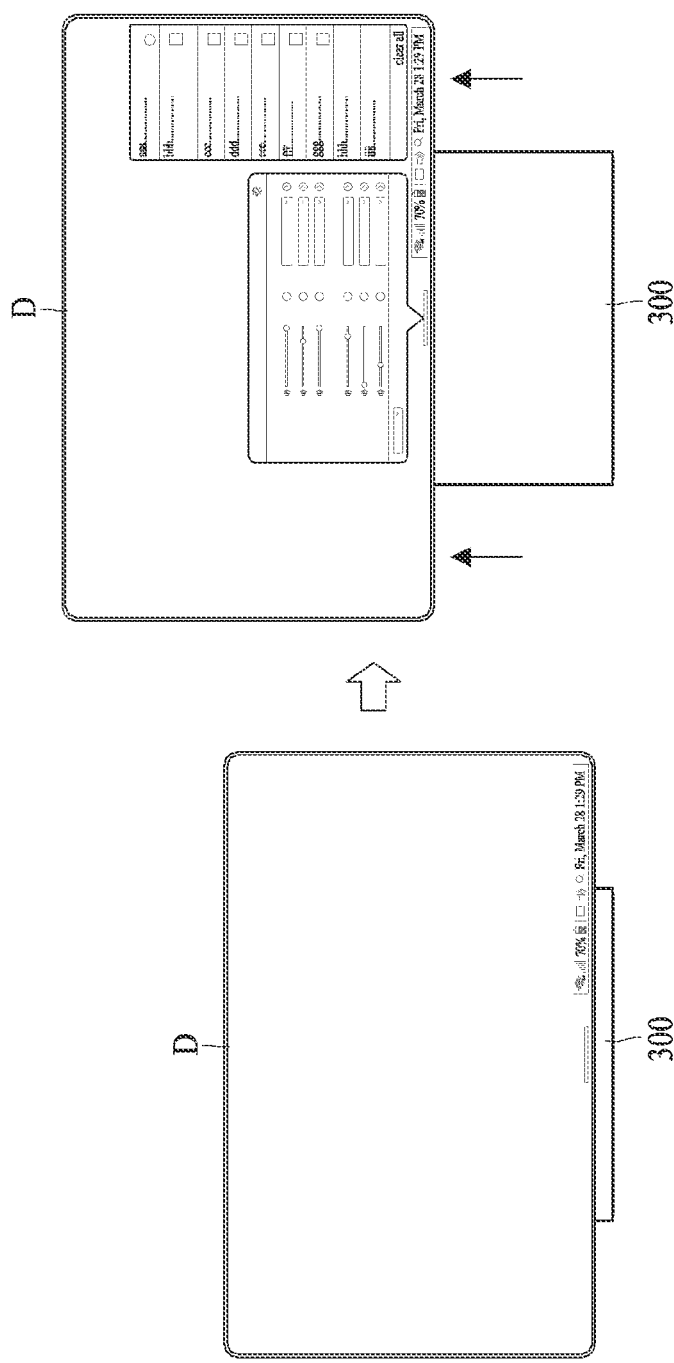
FIG. 12 is a diagram illustrating another example of using a mounting device according to various embodiments.

FIGS. 11 and 12 are diagrams illustrating examples of using the mounting device 300 according various embodiments.

Referring to FIG. 11, a convenience of use of a user may be increased according to an interaction between the mounting device 300 and the display device D during a video call or video conference. The display device D mounted on the mounting device 300 in a standing-view state according to an embodiment may recognize an angle at which the mounting device 300 is slanted and an output image may be corrected using an angle adjuster of a built-in camera. If the display device D is slid upwards and mounted on the mounting device 300 in a horizontal floating-view state according to an embodiment, an upward movement may be recognized so that a range of a view angle of the camera may be increased or that an output image may be corrected. In addition, a speaker (e.g., the speaker 928 of FIG. 9) at a lower end of a body plate (e.g., the body plate 920 of FIG. 9) may be opened to provide a rich sound. The speaker 928 according to an embodiment may increase a volume and a sound quality of a sound output when users using the mounting device 400 watch a screen or have a video conference through the display device D. If the display device D is swiveled and is mounted on the mounting device 300 in a vertical floating-view state according to an embodiment, the swiveling may be recognized, so that an output image may be corrected to be positioned in a central portion of a display of the display device D. In addition, an output video call screen may be vertically divided, and thus a video call or video conference may be more easily performed. Referring to FIG. 12, an output of a user interface (UI) of the display device D may be adjusted based on the interaction between the mounting device 300 and the display device D, to increase the convenience of use of the user. The display of the display device D mounted on the mounting device 300 in the standing-view state according to an embodiment may display a setting control bar on a lower end of the display. If the display device D according to an embodiment is slid upwards on the mounting device 300 and is mounted in the horizontal floating-view state, the display of the display device D may recognize switching to the horizontal floating-view state and open various pop-up windows.

The examples of increasing the convenience of use according to the interaction between the mounting device 300 and the display device D have been described above with reference to FIGS. 11 and 12, however, those are merely examples. The convenience of use may be enhanced according to various interactions that can be easily conceived by one of ordinary skill in the art.

According to various example embodiments, a mounting device for mounting a display device may include: a driving plate including a first surface and a second surface opposite to the first surface and configured to move integrally with the display device based on the display device being attached to the first surface, a body plate disposed in parallel with the driving plate to contact at least a portion of the second surface of the driving plate including a slide lock configured to restrict a linear movement of the driving plate, and a stand plate disposed on a surface opposite to a surface of the body plate coupled to the driving plate. The slide lock may be configured to remain locked in a ground mode in which the body plate and the stand plate overlap each other, and may be configured to be unlocked in a stand mode in which the body plate and the stand plate are spaced apart from each other.

In an example embodiment, the body plate may further include a driving member comprising a frame coupled to the second surface of the driving plate and configured to induce a linear movement and a rotational motion of the driving plate, and a sliding guide configured to guide a linear movement path of the driving member. The sliding guide may include a first position in which the driving member is disposed based on a contact area between the second surface of the driving plate and the body plate being maximized, and a second position in which the driving member is disposed based on the contact area between the second surface of the driving plate and the body plate being minimized.

In an embodiment, the slide lock may include a locking member including a protrusion configured to be engaged with locking grooves disposed on both sides of the driving member in contact with the sliding guide and configured to fix the driving member in the first position, and a locking spring disposed on a side of the locking member facing the sliding guide. In the ground mode, the locking spring may be configured to remain compressed such that the locking member is engaged with the locking grooves. In the stand mode, the locking spring may be configured to remain extended such that the locking member is disengaged from the locking grooves.

In an example embodiment, the locking member may include a first magnetic body. The stand plate may include a second magnetic body Mb at a position corresponding to a position of the first magnetic body of the locking member in a state in which the locking spring is compressed. An attractive force may act between the first magnetic body and the second magnetic body.

In an example embodiment, the driving member may include a driving coupler coupled to the driving plate, and a frame, disposed to enclose the driving coupler, which is configured to linearly move along the sliding guide and includes a rotation groove configured to guide a rotational motion of the driving coupler. The driving coupler may be configured to be rotated in the rotation groove of the frame.

In an example embodiment, the driving member may further include an elastic body disposed on an inner surface of the frame and configured to apply an elastic force to the driving coupler. The driving coupler may have a square shape.

In an example embodiment, the body plate may further include a swivel lock configured to fix an angle between the driving plate and the body plate based on linear movement of the driving plate.

In an example embodiment, the body plate may further include a slip lock configured to restrict the driving member from slipping based on the driving member coupled to the driving plate being in the second position.

In an example embodiment, the body plate may further include a swivel lock configured to fix an angle between the driving plate and the body plate based on linear movement of the driving plate, and a slip lock configured to fix a position of the driving plate based on the driving member coupled to the driving plate being in the second position. The swivel lock may be engaged with a swivel lock groove of the driving coupler to restrict a rotation of the driving coupler, and the slip lock may be engaged with locking grooves disposed on both sides of the frame of the driving member in contact with the sliding guide to restrict slipping of the driving member in the second position.

In an example embodiment, the sliding guide may include a gear rack parallel to a longitudinal direction of the sliding guide. The driving member may further include a sliding gear driven in engagement with the gear rack of the sliding guide.

In an example embodiment, the display device may be attached to and detached from the driving plate by a magnetic force.

In an example embodiment, the driving plate may further include a charging unit comprising charging circuitry configured to charge a battery (e.g., the battery 189 of FIG. 1) included in the display device.

In an example embodiment, the stand plate may be configured to contact an edge including a hinge of the body plate. An angle between the stand plate and the body plate may be adjusted by the hinge.

In an example embodiment, the driving plate may further include a device identification unit comprising circuitry configured to identify different information of the display device attached to the first surface of the driving plate.

In an embodiment, the body plate may further include a speaker. The speaker may be activated when the driving member is disposed in the second position.

According to various example embodiments, a mounting device for mounting a display device may include: a driving plate including a first surface and a second surface opposite to the first surface configured to move integrally with the display device based on the display device being attached to the first surface, a body plate disposed in parallel with the driving plate to contact at least a portion of the second surface of the driving plate, and a stand plate disposed on a surface opposite to a surface of the body plate coupled to the driving plate configured to contact at least one edge of the body plate. The body plate may include a swivel lock configured to fix an angle between the driving plate and the body plate based on linear movement of the driving plate.

In an example embodiment, the body plate may further include a driving member comprising a frame coupled to the second surface of the driving plate and configured to induce a linear movement and a rotational motion of the driving plate, and a sliding guide configured to guide a linear movement path of the driving member. The sliding guide may include a first position in which the driving member is disposed based on a contact area between the second surface of the driving plate and the body plate being maximized, and a second position in which the driving member is disposed based on the contact area between the second surface of the driving plate and the body plate being minimized.

In an example embodiment, the driving member may include a swivel lock groove engaged with the swivel lock of the body plate. The swivel lock may protrude in a direction toward the second surface of the driving plate along the linear movement path on the sliding guide. Based on the driving member being disposed in the second position, the swivel lock groove may be disengaged from the first friction member.

In an example embodiment, the body plate may further include a slip lock configured to restrict the driving plate from slipping.

According to various example embodiments, a mounting device for mounting a display device may include: a driving plate including a first surface and a second surface opposite to the first surface and configured to move integrally with the display device based on the display device being attached to the first surface, a body plate disposed in parallel with the driving plate to contact at least a portion of the second surface of the driving plate and including a slide lock configured to restrict a linear movement of the driving plate, and a stand plate disposed on a surface opposite to a surface of the body plate coupled to the driving plate and configured to contact at least one edge of the body plate. The slide lock may be configured to remain locked in a ground mode in which the body plate and the stand plate overlap each other, and may be configured to be unlocked in a stand mode in which the body plate and the stand plate are spaced apart from each other by a specified distance or greater with respect to the edge as an axis. The body plate may further include a swivel lock configured to fix an angle between the driving plate and the body plate based on linear movement of the driving, and a slip lock configured to restrict the driving plate from slipping.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A stand device for a display device, the stand device comprising:
    a driving plate comprising a first surface, and a second surface opposite to the first surface, the driving plate configured to move integrally with the display device based on the display device being attached to the first surface;
    a body plate disposed in parallel with the driving plate to contact at least a portion of the second surface of the driving plate, the body plate comprising a slide lock configured to restrict a linear movement of the driving plate; and
    a stand plate rotatably coupled with the body plate at an edge of the body plate,
    wherein the slide lock is configured to remain locked in a ground mode in which the body plate and the stand plate overlap each other, and to be unlocked in a stand mode in which the body plate and the stand plate are spaced apart from each other.

2. The stand device of claim 1, wherein the body plate further comprises:
    a driving member comprising a frame coupled to the second surface of the driving plate and configured to induce a linear movement and a rotational motion of the driving plate; and
    a sliding guide configured to guide a linear movement path of the driving member,
    wherein the sliding guide comprises:
        a first position in which the driving member is disposed based on a contact area between the second surface of the driving plate and the body plate being maximized; and
        a second position in which the driving member is disposed based on the contact area between the second surface of the driving plate and the body plate being minimized, and
    wherein the driving member is configured to move between the first position and the second position.

3. The stand device of claim 2, wherein the slide lock comprises:
    a locking member including a protrusion configured to be engaged with locking grooves disposed on both sides of the driving member in contact with the sliding guide and configured to fix the driving member in the first position; and
    a locking spring disposed on a side of the locking member facing the sliding guide,
    wherein in the ground mode, the locking spring is configured to remain compressed such that the locking member is engaged with the locking grooves, and
    wherein in the stand mode, the locking spring is configured to remain extended such that the locking member is disengaged from the locking grooves.

4. The stand device of claim 3, wherein
    the locking member comprises a first magnetic body,
    the stand plate comprises a second magnetic body at a position corresponding to a position of the first magnetic body of the locking member in a state in which the locking spring is compressed, and
    an attractive force acts between the first magnetic body and the second magnetic body.

5. The stand device of claim 2, wherein the driving member comprises:

a driving coupler coupled to the driving plate; and a frame disposed to enclose the driving coupler and configured to move linearly along the sliding guide, the frame comprising a rotation groove configured to guide a rotational motion of the driving coupler, wherein the driving coupler is configured to be rotated in the rotation groove of the frame unit.

6. The stand device of claim 5, wherein the driving member further comprises an elastic body disposed on an inner surface of the frame and configured to apply an elastic force to the driving coupler, and the driving coupler has a substantially square shape.

7. The stand device of claim 5, wherein the body plate further comprises a swivel lock configured to fix an angle between the driving plate and the body plate based on linear movement of the driving plate; and a slip lock configured to fix a position of the driving plate based on the driving member coupled to the driving plate being in the second position, wherein the swivel lock is engaged with a swivel lock groove of the driving coupling unit to restrict a rotation of the driving coupling unit, and the slip lock is engaged with locking grooves disposed on both sides of the frame of the driving member in contact with the sliding guide to restrict slipping of the driving member in the second position.

8. The stand device of claim 2, wherein the body plate further comprises a slip lock configured to restrict the driving member from slipping based on the driving member coupled to the driving plate being in the second position.

9. The stand device of claim 2, wherein the sliding guide comprises a gear rack parallel to a longitudinal direction of the sliding guide, and the driving member further comprises a sliding gear configured to be driven in engagement with the gear rack of the sliding guide.

10. The stand device of claim 2, wherein the body plate further comprises a speaker, wherein the speaker is activated based on the driving member being disposed in the second position.

11. The stand device of claim 1, wherein the body plate further comprises a swivel lock configured to fix an angle between the driving plate and the body plate based on linear movement of the driving plate.

12. The stand device of claim 1, wherein the display device is attached to and detached from the driving plate by a magnetic force.

13. The stand device of claim 1, wherein the driving plate further comprises a charging unit comprising circuitry configured to charge a battery included in the display device.

14. The stand device of claim 1, wherein the stand plate is configured to contact an edge including a hinge of the body plate, and an angle between the stand plate and the body plate is adjusted by the hinge.

15. The stand device of claim 1, wherein the driving plate further comprises a device identification unit comprising circuitry configured to identify different information of the display device attached to the first surface of the driving plate.

* * * * *